(12) United States Patent
Kenoyer et al.

(10) Patent No.: US 7,907,164 B2
(45) Date of Patent: Mar. 15, 2011

(54) INTEGRATED VIDEOCONFERENCING SYSTEM

(75) Inventors: Michael L. Kenoyer, Austin, TX (US); Patrick D. Vanderwilt, Austin, TX (US); Craig B. Malloy, Austin, TX (US); William V. Oxford, Austin, TX (US); Wayne E. Mock, Round Rock, TX (US); Jonathan I. Kaplan, Palo Alto, CA (US); Jesse A. Fourt, La Honda, CA (US)

(73) Assignee: LifeSize Communications, Inc., Austin, TX (US)

( * ) Notice: Subject to any disclaimer, the term of this patent is extended or adjusted under 35 U.S.C. 154(b) by 1365 days.

(21) Appl. No.: 11/405,686

(22) Filed: Apr. 17, 2006

(65) Prior Publication Data

US 2007/0009114 A1 Jan. 11, 2007

Related U.S. Application Data

(60) Provisional application No. 60/676,918, filed on May 2, 2005, provisional application No. 60/761,869, filed on Jan. 24, 2006.

(51) Int. Cl.
*H04N 7/14* (2006.01)
(52) U.S. Cl. ............ 348/14.01; 348/14.08; 455/575.1
(58) Field of Classification Search .... 348/14.01–14.16; 381/26, 313, 92; 455/550.1, 566, 575.1
See application file for complete search history.

(56) References Cited

U.S. PATENT DOCUMENTS

| | | | |
|---|---|---|---|
| 4,686,698 A | 8/1987 | Tompkins et al. | |
| 4,893,326 A | 1/1990 | Duran et al. | |
| 5,014,267 A | 5/1991 | Tompkins et al. | |
| 5,153,724 A * | 10/1992 | Miyoshi et al. | 348/706 |
| 5,374,952 A | 12/1994 | Flohr | |
| 5,617,539 A | 4/1997 | Ludwig et al. | |
| 5,689,641 A | 11/1997 | Ludwig et al. | |
| 5,715,319 A * | 2/1998 | Chu | 381/26 |
| 5,751,338 A | 5/1998 | Ludwig, Jr. | |

(Continued)

FOREIGN PATENT DOCUMENTS

JP 5181639 7/1993

OTHER PUBLICATIONS

Mazurek et al. ; Portable Stand-Aline Video Telephone System; Jul. 8, 1999; WO 99/34600.*

(Continued)

*Primary Examiner* — Melur Ramakrishnaiah
(74) *Attorney, Agent, or Firm* — Meyertons Hood Kivlin Kowert & Goetzel, P.C.; Jeffrey C. Hood

(57) ABSTRACT

In some embodiments, the components of a videoconferencing system may be incorporated in a unitary housing. For example, an integrated videoconferencing system may include microphones to capture participant audio and a camera to capture participant video (along with corresponding audio processing capabilities) in a unitary housing. The unitary housing may also include speakers to produce audio from conference participants and a display to provide video of conference participants. The integrated videoconferencing system may include a codec for encoding and/or decoding). The integrated videoconferencing system may also perform other conference related functions. The integrated videoconferencing system may be used as a speakerphone (e.g., in audio only calls) and/or a videoconference system. The integrated videoconferencing system may also fold into a compact form for portability.

19 Claims, 25 Drawing Sheets

U.S. PATENT DOCUMENTS

| | | | |
|---|---|---|---|
| 5,841,763 | A | 11/1998 | Leondires et al. |
| 5,900,907 | A | 5/1999 | Malloy et al. |
| 5,990,931 | A | 11/1999 | Nimri et al. |
| 6,160,573 | A | 12/2000 | Allen et al. |
| 6,590,604 | B1 | 7/2003 | Tucker et al. |
| 6,594,688 | B2 | 7/2003 | Ludwig et al. |
| 6,603,501 | B1 | 8/2003 | Parry et al. |
| 6,774,928 | B2 | 8/2004 | Bruzzone |
| 6,816,904 | B1 | 11/2004 | Ludwig et al. |
| 6,847,403 | B1 | 1/2005 | Forsberg, Jr. et al. |
| D539,280 | S | 3/2007 | Andresen |
| D540,762 | S | 4/2007 | Lunde |
| D540,789 | S | 4/2007 | Sagen et al. |
| D559,210 | S | 1/2008 | Brown et al. |
| D559,211 | S | 1/2008 | Brown et al. |
| 2001/0042114 | A1* | 11/2001 | Agraharam et al. ......... 709/223 |
| 2003/0174146 | A1 | 9/2003 | Kenoyer |
| 2004/0001137 | A1* | 1/2004 | Cutler et al. ............... 348/14.08 |
| 2004/0041902 | A1* | 3/2004 | Washington ............... 348/14.01 |
| 2004/0183897 | A1 | 9/2004 | Kenoyer et al. |
| 2005/0198134 | A1 | 9/2005 | Kenoyer et al. |
| 2006/0277254 | A1 | 12/2006 | Kenoyer et al. |
| 2007/0009113 | A1 | 1/2007 | Kenoyer |
| 2007/0165106 | A1 | 7/2007 | Groves et al. |

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

P. H. Down; "Introduction to Videoconferencing"; http://www.video.ja.net/intro/; 2001; 26 pages.

E. J. Addeo, A.D. Gelman and A.B. Dayao; "Personal Multi-media Multi-point Communication Services for Broadband Networks", Global Telecommunications Conference and Exhibition; Nov.-Dec. 1988; pp. 53-57; vol. 1.

Joe W. Duran and Michael Kenoyer; "A PC-compatible, multiprocessor workstation for video, data, and voice communication"; Proceedings of SPIE, Visual Communications and Image Processing IV; Nov. 1989; pp. 232-236; VideoTelecom Corp.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Christoph Weiss; "Desk Top Video Conferencing—An Important Feature of Future Visual Communications"; IEEE International Conference on Communications; Apr. 1990; pp. 134-139; vol. 1.

Aurel A. Lazar and Koon-Seng Lim; "Programmability and Service Creation for Multimedia Networks"; Fifth IEEE International Symposium on High Performance Distributed Computing; 1996; pp. 217-223.

"Polycom Executive Collection"; Jun. 2003; 4 pages; Polycom, Inc.; Pleasanton, CA.

* cited by examiner

INTEGRATED VIDEOCONFERENCING SYSTEM

PRIORITY

This application claims priority to U.S. Provisional Patent Application Ser. No. 60/676,918 titled "Audio and Videoconferencing", which was filed May 2, 2005, whose inventors are Michael L. Kenoyer, Wayne Mock, and Patrick D. Vanderwilt which is hereby incorporated by reference in its entirety as though fully and completely set forth herein.

This application further claims priority to U.S. Provisional Patent Application Ser. No. 60/761,869 titled "Integrated Video Conferencing System", which was filed Jan. 24, 2006, whose inventors are Michael L. Kenoyer which is hereby incorporated by reference in its entirety as though fully and completely set forth herein.

BACKGROUND OF THE INVENTION

1. Field of the Invention

The present invention relates generally to conferencing and, more specifically, to videoconferencing.

2. Description of the Related Art

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from a remote participant. Each videoconferencing system may also be coupled to a computer system to allow additional functionality into the videoconference. For example, additional functionality may include data conferencing (including displaying and/or modifying a document for both participants during the conference).

SUMMARY OF THE INVENTION

In various embodiments, a multi-component videoconferencing system (MCVCS) may be used as a videoconferencing endpoint. The MCVCS may include a camera, microphones, speakers, and a codec possibly used in conjunction with a computer system. The camera and speakers may be coupled to or placed around a display. The display may be a computer system display and, along with displaying video for the videoconference, may also be used to display output from the computer system. The MCVCS may send/receive signals through a network coupled to the computer system or to one of the MCVCS components. The various functions to support the videoconference (e.g., compression and decompression of video signals) may be performed by circuitry in the camera base, codec box, and/or the computer system. In some embodiments, the codec functionality may be incorporated in the camera base and the MCVCS system may not have a separate codec box. In some embodiments, the MCVCS may be portable.

In some embodiments, the codec functionality may be incorporated in a set-top box (e.g., a cable box, satellite box, or gaming module). A camera may be included on top of a display coupled to the set-top box or placed on the set-top box. The codec's audio and video processing may be incorporated in the set-top box and/or may be distributed (e.g., to other devices through a cable coupling the devices to the set-top box). The set-top box may be coupled to the different components of the videoconferencing system including the camera, speakers, microphones, and display.

In some embodiments, the computer system may be a laptop computer. The videoconferencing components may be coupled to the laptop. The laptop display and/or speakers may be used in presenting the videoconference. The MCVCS components for use with a laptop may be smaller than the components used with other computer systems. The components coupled to the laptop computer may be placed around the laptop computer.

In some embodiments, the components of the MCVCS may be incorporated into a unitary housing. For example, an integrated videoconferencing system may include microphones to capture participant audio and a camera to capture participant video (along with corresponding audio processing capabilities) in a unitary housing. The unitary housing may also include speakers to produce audio from conference participants and a display to provide video of conference participants. The integrated videoconferencing system may include a codec for encoding and/or decoding). The integrated videoconferencing system may also perform other conference related functions. The integrated videoconferencing system may be used as a speakerphone (e.g., in audio only calls) and/or a videoconference system. The integrated videoconferencing system may also fold into a compact form for portability.

In some embodiments, ported speakers may be used to maximize sound quality for the provided speaker size. In some embodiments, phase plugs may also be used to improve sound dispersion from the speakers.

BRIEF DESCRIPTION OF THE DRAWINGS

A better understanding of the present invention may be obtained when the following detailed description is considered in conjunction with the following drawings, in which.

Figure 1:
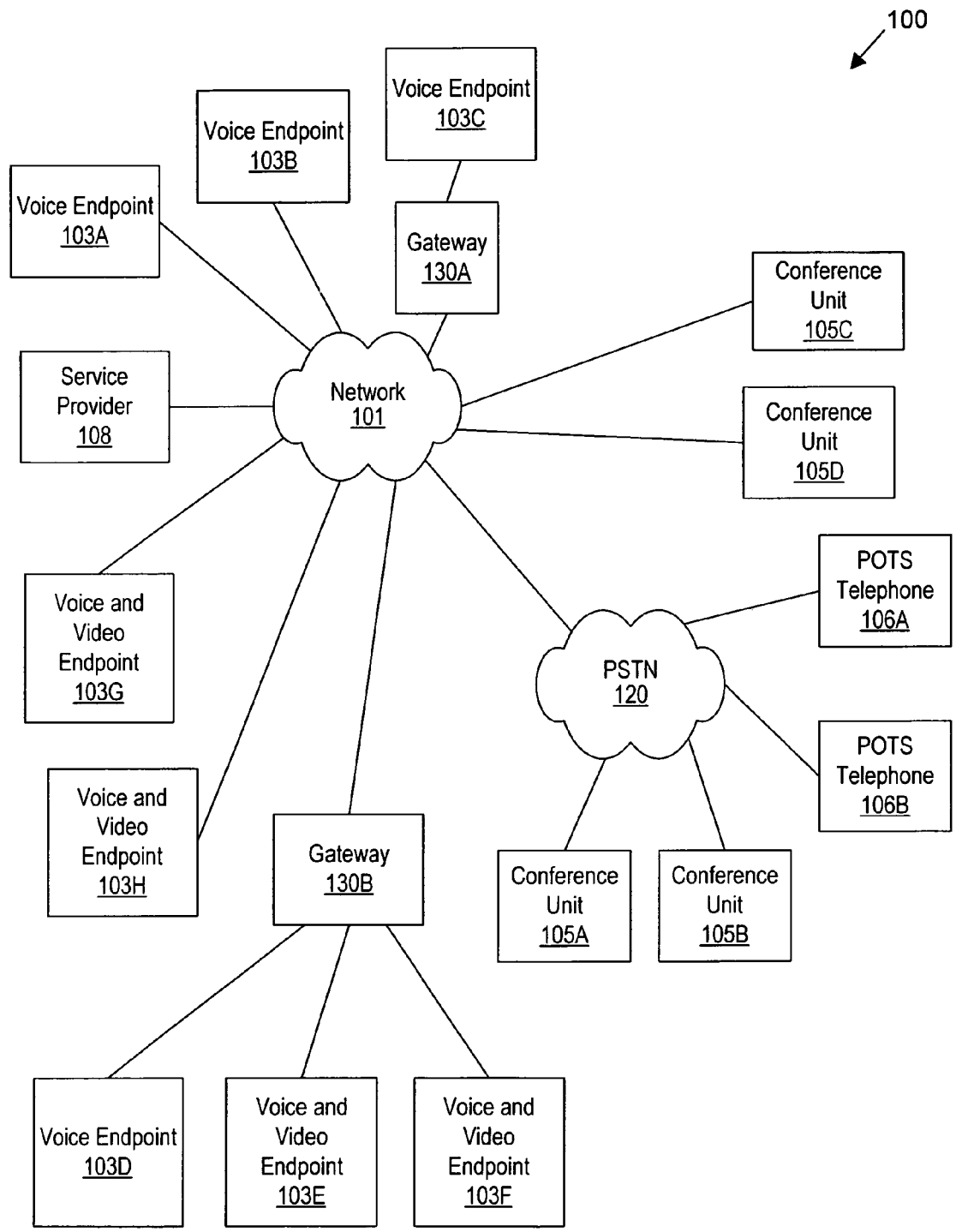
FIG. 1 illustrates a videoconferencing system, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone. Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

FIG. 1 illustrates an embodiment of a videoconferencing system 100. Videoconferencing system 100 comprises a plurality of participant locations or endpoints. FIG. 1 illustrates an exemplary embodiment of a videoconferencing system 100 which may include a network 101, endpoints 103A-103H (e.g., audio and/or videoconferencing systems), gateways 130A-130B, a service provider 108 (e.g., a multipoint control unit (MCU)), a public switched telephone network (PSTN) 120, conference units 105A-105D, and plain old telephone system (POTS) telephones 106A-106B. Endpoints 103C and 103D-103H may be coupled to network 101 via gateways 130A and 130B, respectively, and gateways 130A and 130B may each include firewall, network address translation (NAT), packet filter, and/or proxy mechanisms, among others. Conference units 105A-105B and POTS telephones 106A-106B may be coupled to network 101 via PSTN 120. In some embodiments, conference units 105A-105B may each be coupled to PSTN 120 via an Integrated Services Digital Network (ISDN) connection, and each may include and/or implement H.320 capabilities. In various embodiments, video and audio conferencing may be implemented over various types of networked devices.

In some embodiments, endpoints 103A-103H, gateways 130A-130B, conference units 105C-105D, and service provider 108 may each include various wireless or wired communication devices that implement various types of communication, such as wired Ethernet, wireless Ethernet (e.g., IEEE 802.11), EEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103A-103H, conference units 105A-105D, POTS telephones 106A-106B, etc.) that communicate through various networks (e.g., network 101, PSTN 120, the Internet, etc.).

In some embodiments, endpoints 103A-103C may include voice conferencing capabilities and include or be coupled to various audio devices (e.g., microphones, audio input devices, speakers, audio output devices, telephones, speaker telephones, etc.). Endpoints 103D-103H may include voice and video communications capabilities (e.g., videoconferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103A-103H may comprise various ports for coupling to one or more devices (e.g., audio devices, video devices, etc.) and/or to one or more networks.

In some embodiments, conference units 105A-105D may include voice and/or videoconferencing capabilities and include or be coupled to various audio devices (e.g., microphones, audio input devices, speakers, audio output devices, telephones, speaker telephones, etc.) and/or include or be coupled to various video devices (e.g., monitors, projectors, displays, televisions, video output devices, video input devices, cameras, etc.). In some embodiments, endpoints 103A-103H and/or conference units 105A-105D may include and/or implement various network media communication capabilities. For example, endpoints 103A-103H and/or conference units 105C-105D may each include and/or implement one or more real time protocols, e.g., session initiation protocol (SIP), H.261, H.263, H.264, H.323, among others. In an embodiment, endpoints 103A-103H may implement H.264 encoding for high definition (HD) video streams.

In various embodiments, a codec may implement a real time transmission protocol. In some embodiments, a codec (which may mean short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, a videoconferencing system may be designed to operate with network infrastructures that support T1 capabilities or less, e.g., 1.5 mega-bits per second or less in one embodiment, and 2 mega-bits per second in other embodiments. The videoconferencing system may support HD capabilities. The term "high resolution" includes displays with resolution of 1280×720 pixels and higher. In one embodiment, high-definition resolution may comprise 1280× 720 progressive scans at 60 frames per second, or 1920×1080 interlaced or 1920×1080 progressive. Thus, an embodiment of the present invention may comprise a videoconferencing system with HD "e.g. similar to HDTV" display capabilities using network infrastructures with bandwidths T1 capability or less. The term "high-definition" is intended to have the full breath of its ordinary meaning and includes "high resolution".

Figure 2:
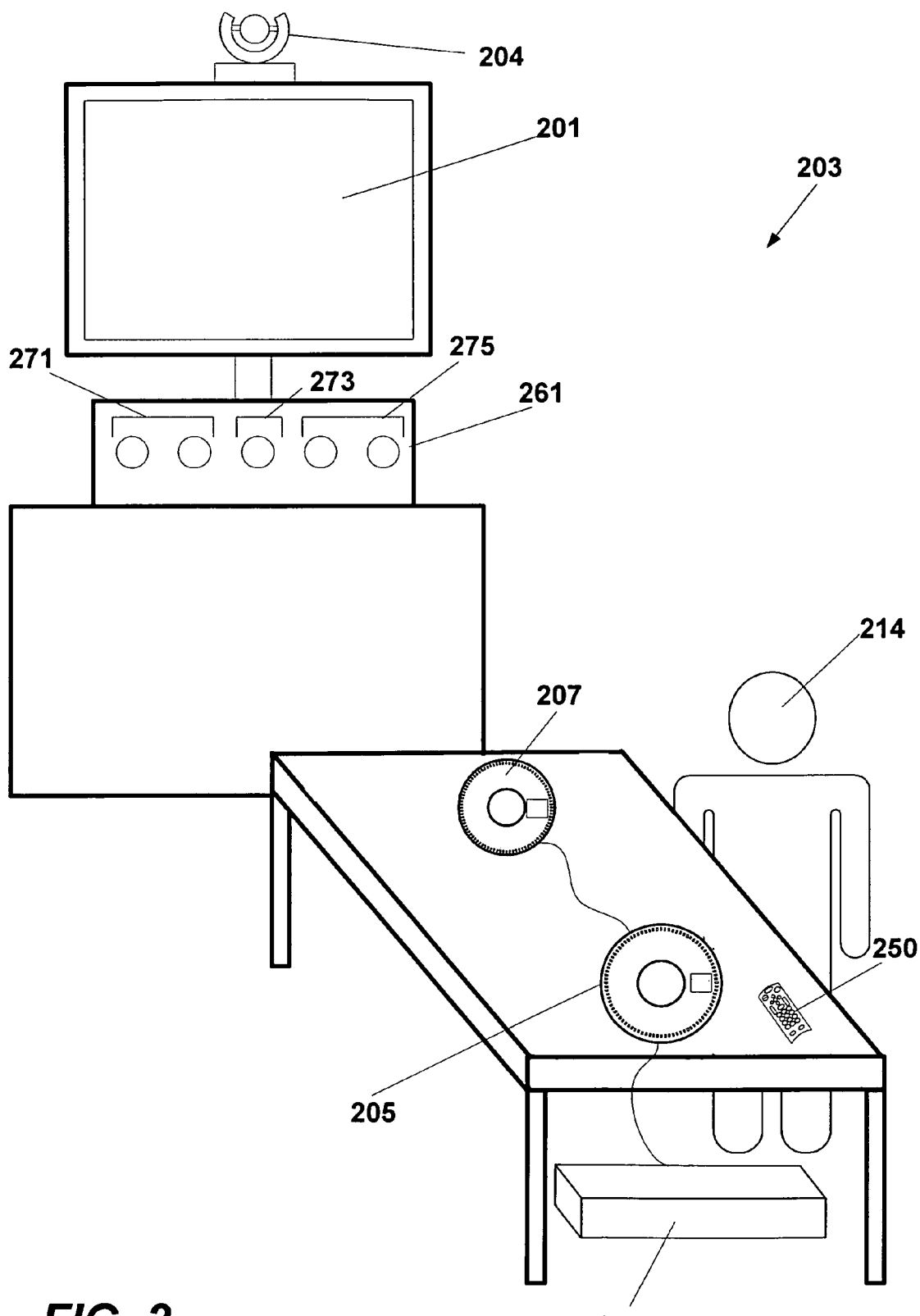
FIG. 2 illustrates a videoconferencing system participant location, according to an embodiment.

FIG. 2 illustrates an embodiment of a participant location, also referred to as an endpoint or conferencing unit (e.g., a videoconferencing system). The videoconference system may have a system codec 209 to manage both a speakerphone 205/207 and a videoconferencing system 203. The speakerphones 205/207 and other videoconferencing system components may be coupled to the codec 209 and may receive audio and/or video signals from the system codec 209.

In some embodiments, the participant location may include a camera 204 (e.g., an HD camera) for acquiring images (e.g., of participant 214) of the participant location. Other cameras are also contemplated. The participant location may also include a display 201 (e.g., an HDTV display). Images acquired by the camera 204 may be displayed locally on the display 201 and may also be encoded and transmitted to other participant locations in the videoconference.

The participant location may also include a sound system 261. The sound system 261 may include multiple speakers including left speakers 271, center speaker 273, and right speakers 275. Other numbers of speakers and other speaker configurations may also be used. The videoconferencing system 203 may also use one or more speakerphones 205/207 which may be daisy chained together.

In some embodiments, the videoconferencing system components (e.g., the camera 204, display 201, sound system 261, and speakerphones 205/207) may be coupled to a system codec 209. The system codec 209 may be placed on a desk or on a floor. Other placements are also contemplated. The system codec 209 may receive audio and/or video data from a network. The system codec 209 may send the audio to the speakerphone 205/207 and/or sound system 261 and the video to the display 201. The received video may be HD video that is displayed on the HD display. The system codec 209 may also receive video data from the camera 204 and audio data from the speakerphones 205/207 and transmit the video and/or audio data over the network to another conferencing system. The conferencing system may be controlled by a participant through the user input components (e.g., buttons) on the speakerphones 205/207 and/or remote control 250. Other system interfaces may also be used.

Figure 3:
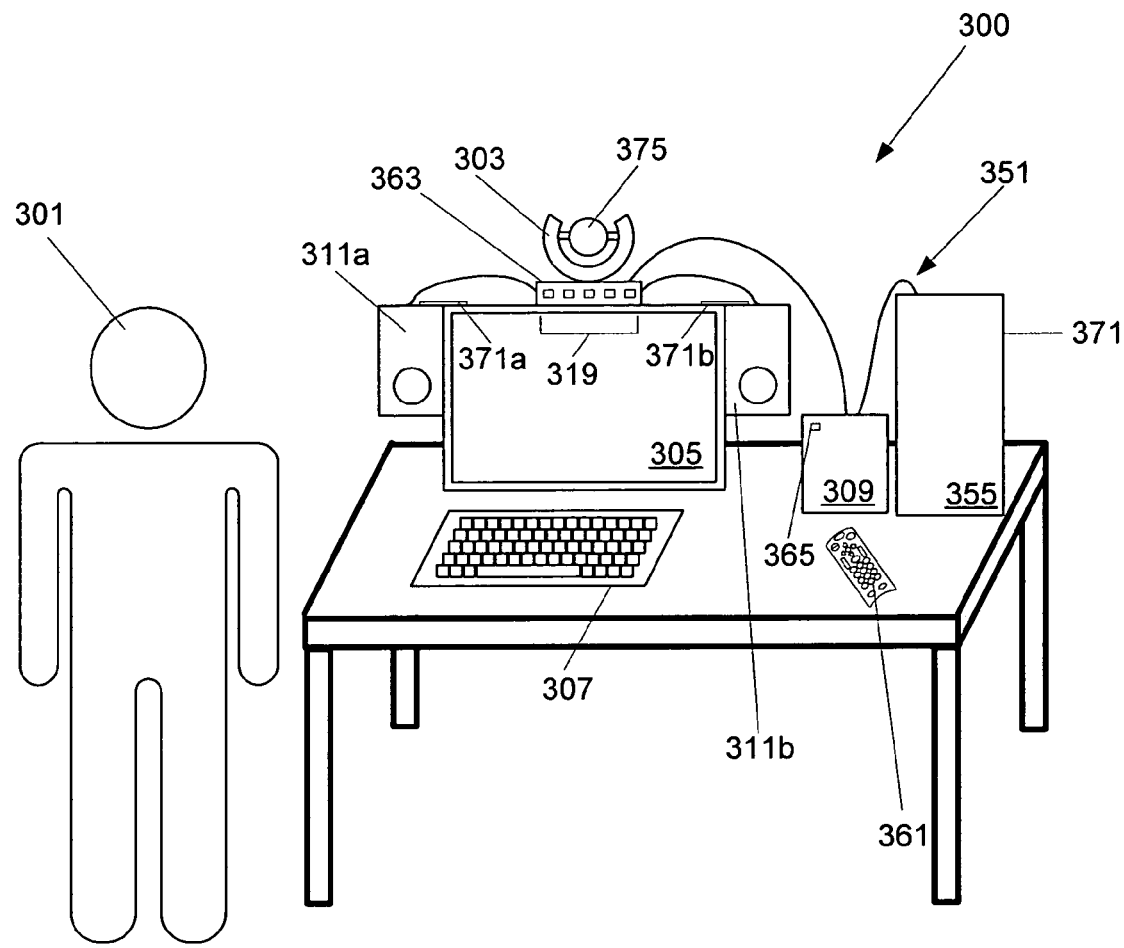
FIG. 3 illustrates a participant location with an MCVCS, according to an embodiment.

FIG. 3 illustrates an embodiment of a participant location with a MCVCS 300. In some embodiments, a participant 301 may use an MCVCS 300 to communicate with other participants in the audio and/or videoconference. The MCVCS 300 may include microphones 319 to capture participant audio and a camera 303 to capture participant video. The MCVCS 300 may also include speakers 311*a-b* to produce audio from remote conference participants and a display 305 to provide video from local and remote conference participants. In some embodiments, the MCVCS may be portable.

In some embodiments, the MCVCS 300 may include an encoder/decoder functionality (e.g., external codec 309 with processing chips for encoding and/or decoding). The MCVCS 300 may also include communication functionality for conducting a videoconference (e.g., communication processors) over a network. The MCVCS 300 may be based on the H.264 standard and provide H.263 support for interoperability. Other standards (e.g., H.323 and Session Initiation Protocol (SIP)) may also be used and/or supported by the MCVCS 300.

The camera 303 may be a fixed zoom/fixed focal length lens portion 375 or may use an adjustable lens portion 375. The lens 375 may be a wide-angle lens (e.g., with approximately a 70 degree field of view). Other fields of view are also contemplated. In some embodiments, the camera 303 may be an HD camera. The camera 307 may be a standard definition (SD) camera. The camera 303 may capture video with resolution for a nominal visual acuity length approximately equal to the distance of a participant's eyes from the display 305 when viewing the videoconference (e.g., approximately 3.3 feet). At the nominal visual acuity length, the display 305 matches the visual acuity of the human eye. The camera 303 may be tilted downward for optimal viewing of the participant 101. The camera 303 may adaptively pan/tilt/zoom or the camera 303 may be fixed and the MCVCS 300 may use electronic pan/tilt/zoom. The camera 303 may provide an HD output to the codec 309 as well as other video receiving devices (e.g., another attached display). The camera 303 may be placed on top of a display 305 used in the conference. The camera 303 may be placed on top of the display 305 using a camera support mechanism. The camera 303 may also be placed at other locations (e.g., in the ceiling). The camera 303 may be moved using motors in the base of the camera 303. External commands received by the camera 303 may be used to control the camera 303 from another device communicatively coupled to the camera 303 (e.g., commands processed in the codec 309 received from a remote control 361).

In some embodiments, the MCVCS 300 may include one or more microphones 319 (e.g., in one or more microphone arrays). For example, the camera base 363 may include an array of five microphones 319 in a broadside configuration. Additional microphones may also be used (e.g., one additional microphone behind (or in front of) one or more of the five microphones 319 to form one or more endfire microphone arrays). Additional microphones may be used for longer endfire arrays. Microphones may also be located in other devices (e.g., attached to the display 305 or the codec 309) or may be in independent housings. The microphone arrays may be located in the camera 303. The microphones may be omni-directional microphones or cardioid microphones. Other microphone types are also contemplated. Audio signals from the microphones 319 may be received by the codec 309 for audio processing. Other components in the conference may also perform the audio processing.

In some embodiments, the broadside and/or endfire microphone array responses may be beamformed to enhance the quality of the audio reproduced from one or more participants (e.g., by steering a virtual beam toward the participant). The microphone array responses may also be used to determine a speaking participant's location and/or direction relative to the MCVCS 300. The location and/or direction information may be sent with the audio signal to a remote conferencing system for placement of the audio in speakers at the remote site relative to the location and/or direction information. For example, audio from participants speaking on the left side of the camera 303 may be placed nearest the participant's displayed image (e.g., the right side display speaker) on the remote side. The MCVCS 300 may support super wide band audio (e.g., 22 kHz responses). Other audio responses/frequencies are also contemplated (e.g., in excess of 22 kHz).

In some embodiments, the display 305 may be an HD display 305 (e.g., with a 1280 by 800 resolution or 1024 by 640 resolution). Other resolutions are also contemplated (e.g., 1680 by 1050 resolution). The display 305 may be a liquid crystal display (LCD). Other display types may also be used (e.g., a cathode ray tube (CRT) display or a plasma display panel (PDP)). The display 305 may have approximately a 20-inch diagonal and a 16:9 aspect ratio. Other diagonals and ratios are also contemplated. For example, the display 305 may have a 17-inch diagonal screen. The display 305 may be a user's computer system display or the display 305 may be dedicated to the MCVCS 300. The display 305 may be coupled to the computer system 355 or the codec 309 (e.g., through a digital visual interface (DVI), universal serial bus (USB), or video graphics array (VGA) connection). Other connection types are also contemplated. The MCVCS 300 may support National Television System Committee (NTSC), Phase Alternation Line (PAL), 720p encode, and/or 4:3 standard definition (SD) along with other standards. The MCVCS 300 may perform auto white balance and/or auto back light compensation to the video to be displayed and/or sent.

In some embodiments, the MCVCS 300 may include one or more speakers 311*a-b* (e.g., ported speakers 311). The speakers 311 may use a titanium cone with a large travel in a tuned sealed enclosure. The speakers 311 may have a large enclosure to maximize air volume and support lower frequencies. Other speaker configurations are also contemplated. The speakers 311 may therefore support lower frequency responses without using a subwoofer (because of the size of the enclosure). Other speakers and speaker types are also contemplated. At least two speakers 311 may be used to provide a stereo effect. At least two speakers 311 may be used to position (e.g., "place") audio in the room (e.g., a higher amplitude signal may be placed through the left speaker 311*a* for a speaking participant displayed on a left side of the display 305). The MCVCS 300 may also include a speakerphone functionality to support the audio for audio and/or video calls. The MCVCS 300 may also perform as a speakerphone (e.g., without transmitting or receiving video).

The MCVCS 300 may support various audio standards (e.g., G.711, G.722, G.722.1, G.723, G.729, and MPEG-4 AAC). The MCVCS audio may be compact disc (CD) quality and full duplex. The MCVCS 300 may perform echo cancellation, automatic gain control, and automatic noise reduction. The MCVCS 300 may include an audio mixer for summing the audio of various conference participants. The MCVCS 300 may include audio over ISDN.

In some embodiments, the MCVCS 300 may include a codec 309 (e.g., for compression/decompression of video signals). The codec 309 may also include an audio codec and echo cancellors. Other videoconference functionality may also be encompassed in the codec 309. The codec 309 may receive local signals from the camera 303 and microphones 319 for transmission to a remote conference site. The codec 309 may compress signals for transmission and decompress received signals for distribution to the display 305 and/or speakers 311. The codec may implement a transcoder as described in U.S. patent application Ser. No. 11/252,238, entitled "Video Conferencing System Transcoder" filed Oct. 17, 2005, whose inventors are Michael L. Kenoyer and Michael V. Jenkins which is hereby incorporated by reference in its entirety as though fully and completely set forth herein.

In some embodiments, signals may be sent/received through a network connection 351. For example, the network connection 351 may be from an IP link 371 coupled to the computer system 355 from an external network (other types of links are also contemplated). The codec 309 may also be coupled directly to the network. If the codec 309 is coupled to the computer system 355, the computer system's video output may also be sent to the display 305 through the codec 309. The codec 309 may display at least part of the computer system displayed output and at least part of a videoconference on the display 305. In some embodiments, the codec 309 may support data conferencing using the computer system 355. For example, documents and/or applications on the computer system 355 may be shared with remote conference sites/remote computer systems.

In some embodiments, the codec 309 may also display videoconference options (e.g., through a graphical user interface (GUI) on screen). In some embodiments, personal computer components may be used in addition to or in place of MCVCS 300 components such as the microphones 319 and speakers 311. The MCVCS 300 may support several videoconferencing display types including single presence and continuous presence (e.g., may display a 4-way multipoint call). In some embodiments, picture-in-picture and selectable camera icons/preview may also be used on the display 305.

In some embodiments, the MCVCS 300 may use a keyboard 307 to dial participants (including an Add Video button to add video participants), control various features of the MCVCS 300, and/or control other aspects of the videoconference. The MCVCS 300 may include a wireless remote 361 (e.g., to perform similar functions as the keyboard 307.) The camera base 361 and/or codec 309 may have a wireless remote sensor 365 (e.g., an infrared sensor).

Figure 4A:
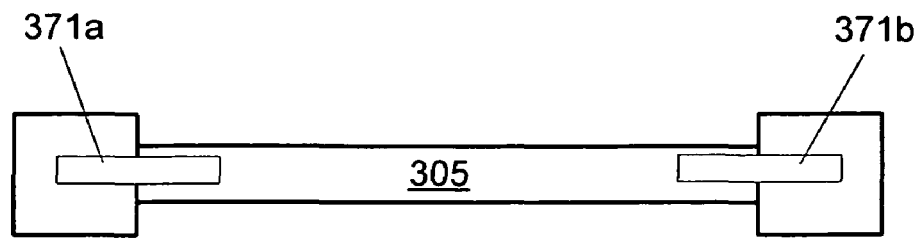
FIGS. 4a-f illustrates speaker attachments, according to an embodiment.
Figure 4B:
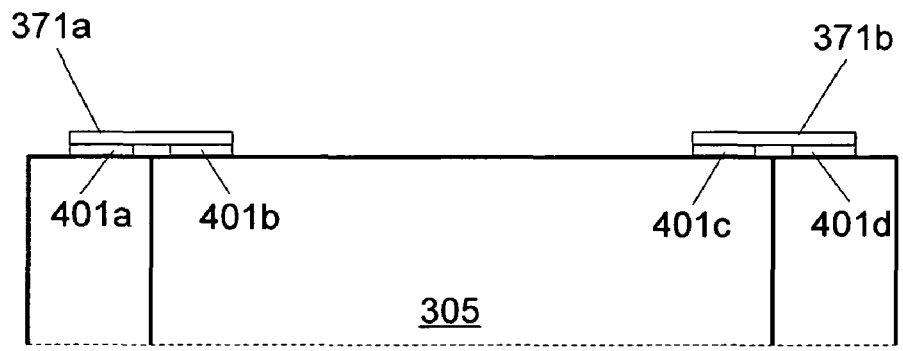
Figure 4C:
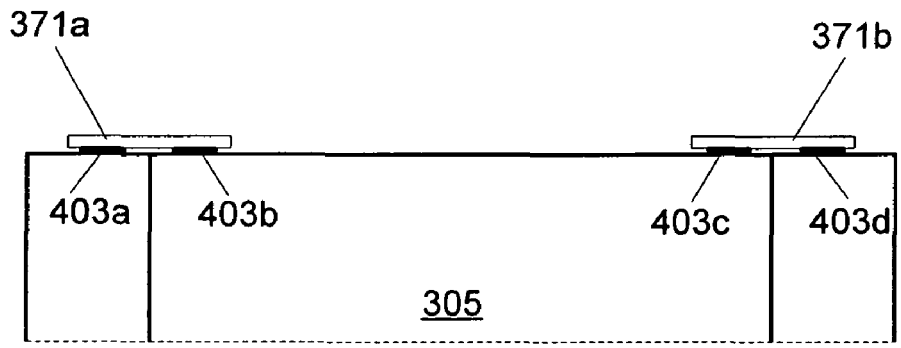
Figure 4D:
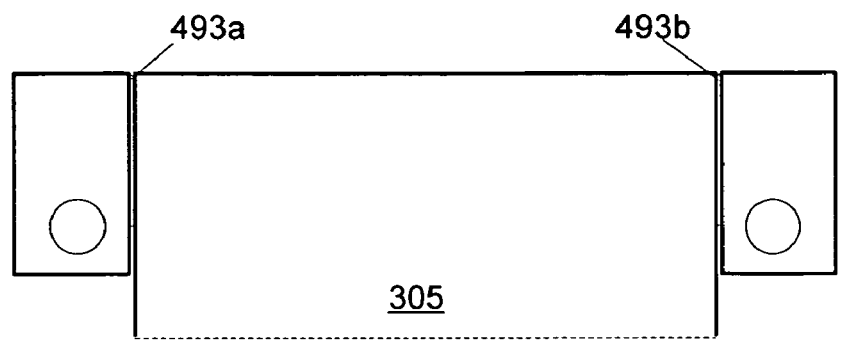
Figure 4E:
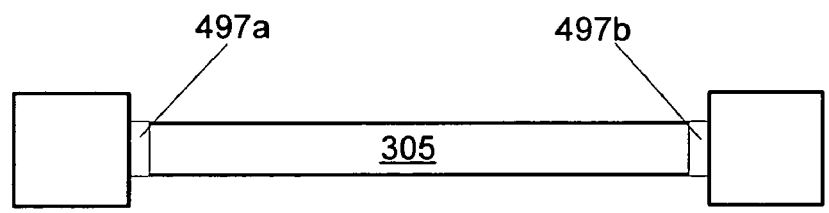
Figure 4F:
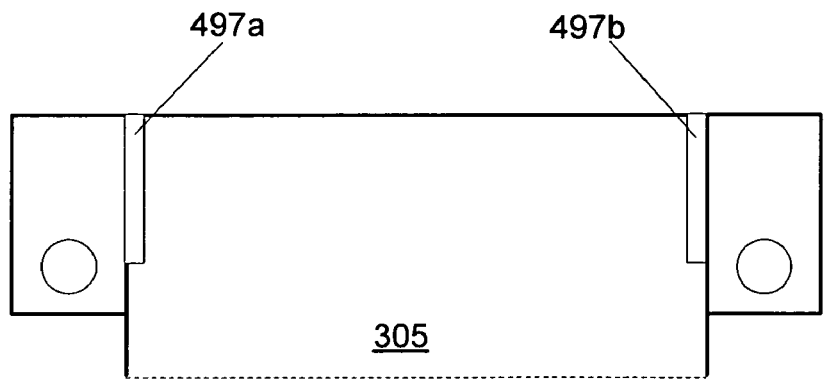

FIGS. 4*a-c* illustrate an embodiment of speaker attachments for speakers 311 in the MCVCS 300. The speaker attachments 371*a-b* may include Velcro™ counterparts 401*a-d*. Attachments 371*a-b* may be corresponding Velcro™ straps. Other attachments are also contemplated. For example, glue 403 may be used to attach the attachments 371*a-b* to the display/speakers. The speakers 311 may also be attached to the display 305 with adhesive 493*a-b* along the sides of the speakers 311. The speakers 311 may be attached to the display 305 using elastic sleeves 497*a-b* attached to the speaker 311 that hugs the sides of the display 305 (other attachments may be used to avoid applying adhesive or modifying the display 305).

Figure 5:
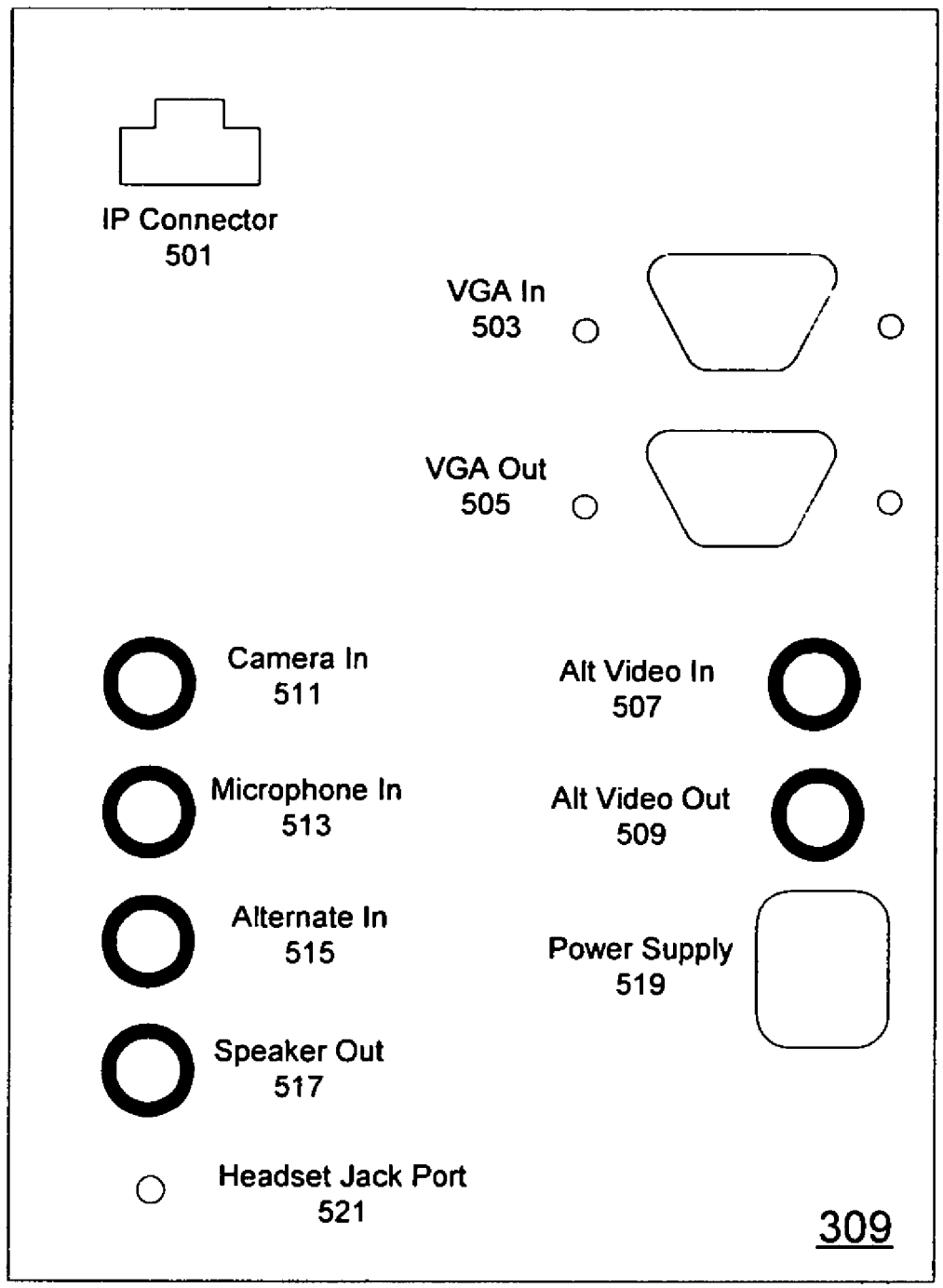
FIG. 5 illustrates a side view of the codec, according to an embodiment.

FIG. 5 illustrates a side view of an embodiment of the codec 309. The codec 309 may include multiple ports. One or more of the sides of the codec 309 (including front and back sides) may have one or more of the shown ports (as well as other ports). For example, the ports may include ports for video input (e.g., VGA-In 503 and Alternate Video-In 507). The codec 309 may communicate with the other components of the MCVCS 300 and the computer system 355 through wireless connections (e.g., infrared or radio frequencies) in addition to or in place of the ports.

In some embodiments, the video input ports may be used for receiving a display signal from the computer system 355 or other network source. The codec 309 may be a pass through for a computer system video signal during non-videoconference times and/or may display at least part of the computer system video output along with the videoconference video output. The codec 309 may also place an interface on part of the computer system display output. The computer system 355 may be coupled directly to the display 305 and may receive a video signal to display from the codec 309.

In some embodiments, ports may also be included for video output (e.g., VGA-Out 505 and Alternate Video-Out 509). These ports may be used to output the video signal from the codec 309 to the display 305. Another port(s) may be included to receive/transmit network signals (e.g., an Ethernet port such as Internet Protocol (IP) port 501). Additional ports (e.g., camera in 511, microphone-in 513, speaker-out 517, etc.) may also be used to receive/send signals to/from various equipment coupled to the codec 309. The camera and microphone array signals may be sent to the codec 309 through one connection (e.g., alternate input 315).

Other ports such as a power supply port 519 and a headset jack port 521 may also be used. The codec 309 may be powered through the power supply port 519 (e.g., with alternating current (AC) power). The codec 309 may be powered over an Ethernet connection (e.g., Power over Ethernet (POE)). In some embodiments, an RS-232 control port may be used. The MCVCS 300 may support plug and play devices. The MCVCS 300 may also support RJ-45 Network Local Area Network (LAN) connections, RJ-11 connections, and RJ-1 connections. In some embodiments, inputs including HD Camera input, S-Video input, Radio Corporation of America (RCA) (L+C+R analog) input, RCA output, VGA input, a composite input, and stereo mini-jack input may also be supported. These and other inputs/outputs (e.g., an external mic jack input) may be provided on the codec 309.

In some embodiments, the MCVCS 300 may support dual streams for sharing PC content during a videoconference (e.g., standards based (H.239) dual streaming for real-time collaboration in HD). Media shared through the MCVCS 300 may include documents, presentations, and PC screens. Other media may also be shared. The MCVCS 300 may support IP to integrated services digital network (ISDN) connectivity. The MCVCS 300 may have dual card bus slots (e.g., on the codec 309) for expansion.

In some embodiments, the MCVCS 300 may include an integrated directory. For example, the directory may be H.350 compliant. The directory may include a hierarchal address book. The MCVCS 300 may use simple network management protocol (SNMP) (including SNMP security alerts). The MCVCS 300 may use a flash based web management tool. The MCVCS 300 may allow for the use of passwords and allow a user to disable IP services, Web, Telnet, and/or File Transfer Protocol (FTP) communications. The MCVCS 300 may use automatic H.323 dialing, automatic H.320 dialing, auto number configuration, auto gatekeeper discovery, and packet loss recovery. The MCVCS 300 may support automatic software upgrades, scheduling, reporting, and multipoint management.

Figure 6:
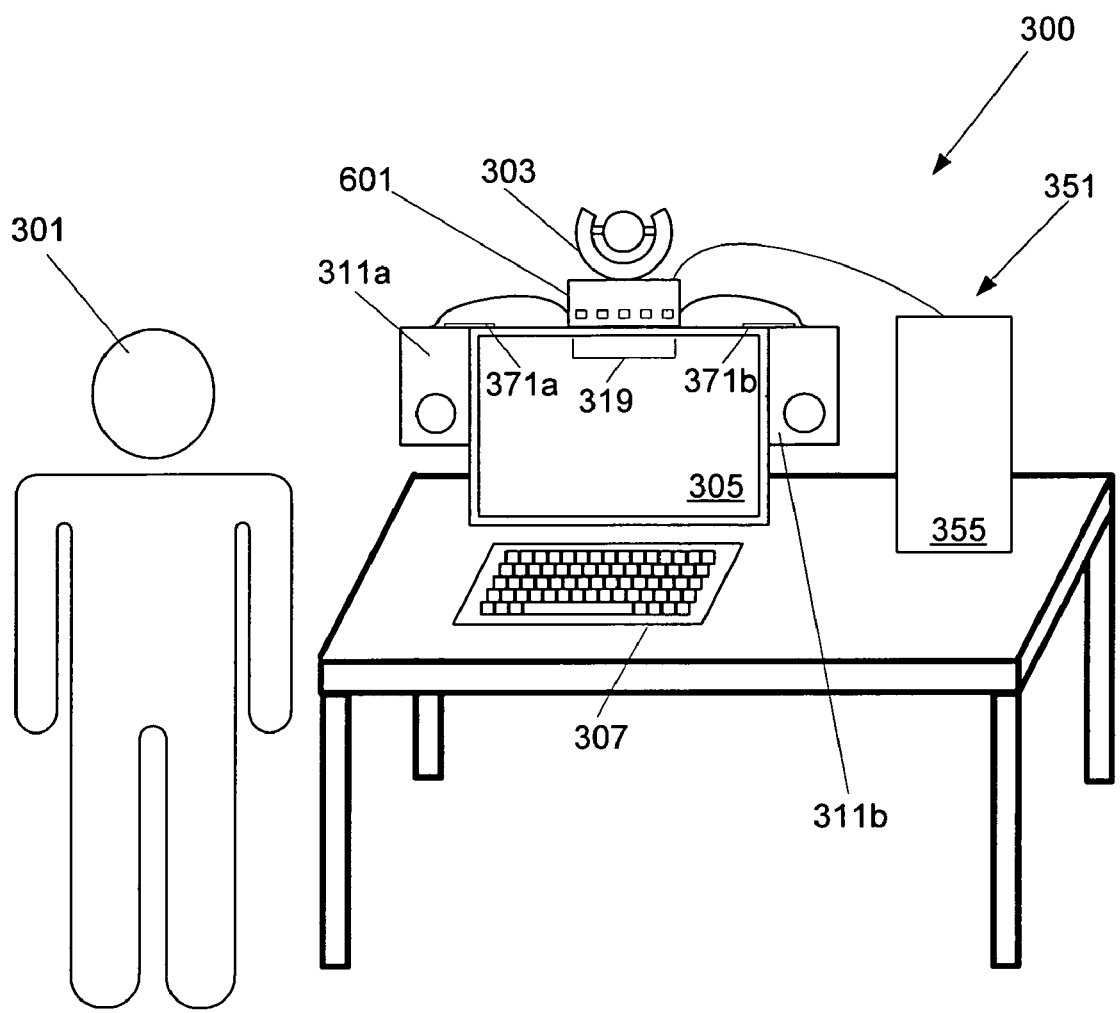
FIG. 6 illustrates an MCVCS without a separate codec unit, according to an embodiment.

FIG. 6 illustrates an embodiment of a MCVCS 300 without an external codec unit. The codec functionality (along with other functionality of the MCVCS 300) may be included in the camera base 601 and/or computer system 355. The camera base 601 and/or computer system 355 may also have the same ports as noted above with respect to the codec 309. The camera base 601 may couple to the computer system 355 and the computer system 355 may provide output to the display 305. The computer system 355 may provide its video output to the camera base 601, and the camera base 601 may provide the video signal to the display 305. In some embodiments, a network link may be provided to the camera base 601 from the computer system 355. In some embodiments, the network link may be routed to the computer system 355 through the camera base 601. In some embodiments, the camera base 601 may be connected directly to the speakers 311. The speakers 311 may be coupled to the computer system 355.

Figure 7A:
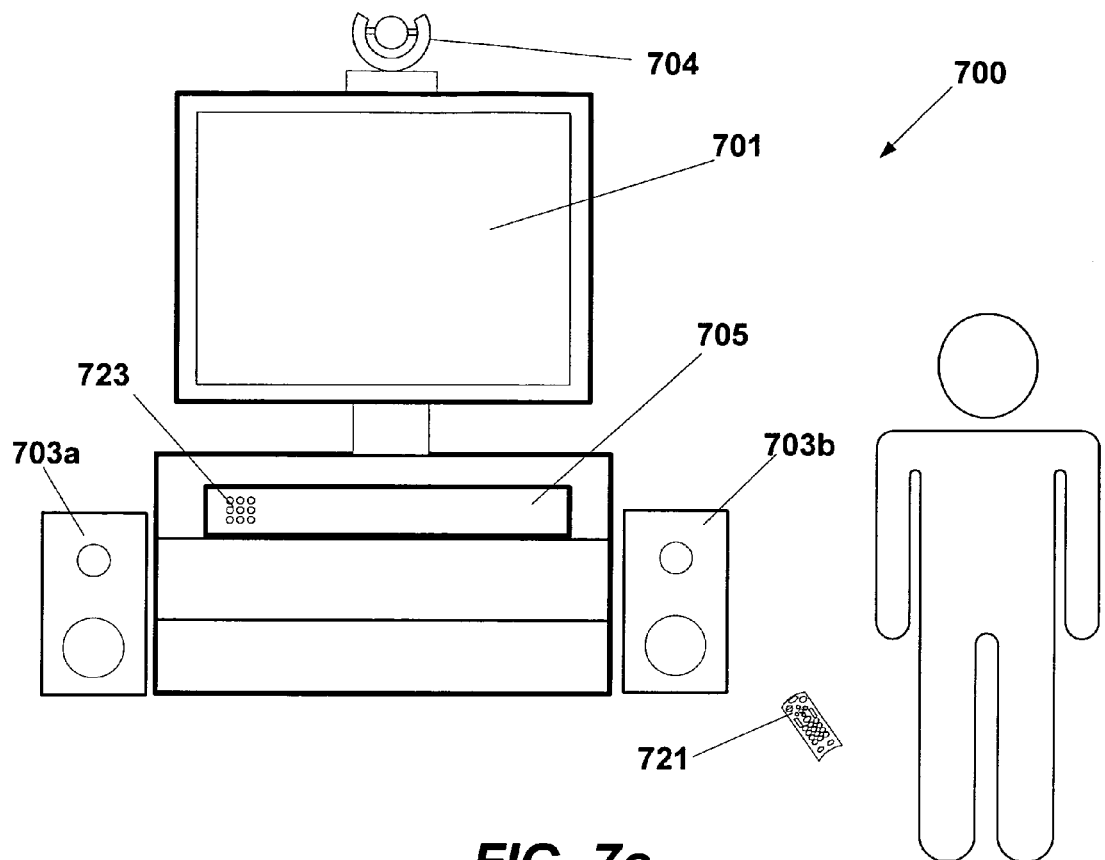
FIGS. 7a-b illustrate a MCVCS with codec functionality incorporated in a set-top box, according to an embodiment.
Figure 7B:
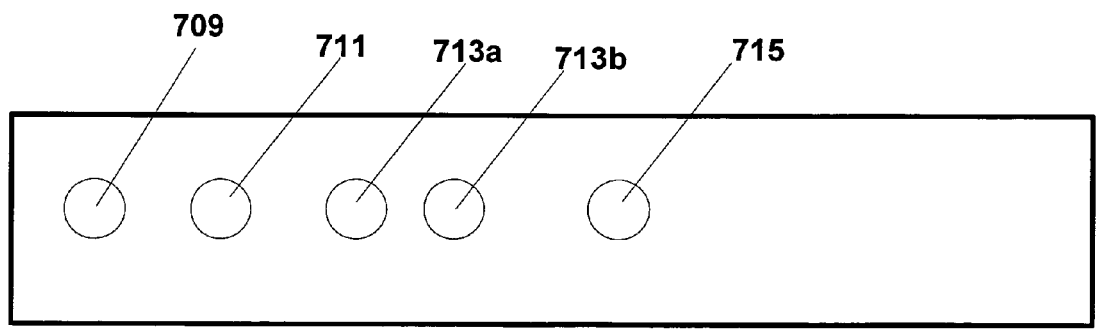

As seen in FIGS. 7*a-b*, in some embodiments, the codec functionality may be incorporated in a set-top box 705 (e.g., a cable box). A camera 704 may be included on top of a display 701 coupled to the set-top box 705 (or placed on the set-top box 705). The processing (e.g., audio and video processing) may be incorporated in the set-top box 705 and/or may be distributed (e.g., to other devices through a cable coupling the devices to the set-top box 705). The set-top box 705 may be coupled to the different components of the MCVCS 700 including the camera 704, speakers 703, microphones, and display. Many of the components may be coupled to the camera 704 and the camera 704 may be coupled to the set-top box 705. The set-top box 705 may be a cable box in a business or private residence. The set-top box 705 may also be a satellite or gaming graphics box. The set-top box/codec 705 may transmit and receive videoconference signals over satellite. The set-top box 705 may process HD content (e.g., HD programming and/or games). The codec may also be in an independent housing that is coupled to the set-top box 705. The codec may act as a pass-through for the regular programming/games when a conference is not being held. The codec may also display at least a portion of the programming/games along with video for the videoconference. The user may communicate with the set-top box 705 through buttons 723 on the set-top box 705 or through a remote control 721. The remote control 721 may be unique to the MCVCS 700 or may be a remote control 721 used with the set-top box 705. The user may also interact with the MCVCS 700 through on-screen menus.

In some embodiments, the set-top box may include a digital video recorder (DVR) functionality. The DVR may record portions or all of the conference for playback. The DVR may also be used to "pause" a live videoconference by recording the conference during the "pause" for playback when the conference is "resumed". The participants may then pick portions of the conference to fast-forward through in order to "catch up" with the conference in real time (i.e., the DVR can record the live portion of the conference while displaying the recorded portion substantially simultaneously). The participants may also view the recorded portion at a higher speed until in line with the live portion. The DVR may also be used as an answering machine. For example, when an incoming videoconference call is received, but not answered, the callers may leave a video/audio message. A greeting (e.g., a video and/or audio greeting) may be used when the videoconference call is answered. The DVR may also be used to answer incoming calls and the incoming video reviewed by a moderator to determine whether the callers should be put through to the conference. For example, the moderator may redirect a call received from callers seeking a different conference than the conference they attempted to dial into. The DVR may also be used to place an intentional delay in the conference. For example, the conference may be monitored by a moderator to block any inappropriate portions from reaching the other participants. For example, if a trade secret or other sensitive piece of information is accidentally provided, the information may be stopped (e.g., by a local participant or conference moderator) before the information is sent to the remote sites. The conference may be relayed through the DVR before it is sent to remote participants.

The set-top box 705 may include a camera port 709 (e.g., for an HD camera). The set-top box 705 may also include video ports (e.g., S-Video port 711), audio ports (e.g., audio ports 713*a-b*), and cable port 715, among others. The set-top box 705 may also communicate with components in the conference through wireless communications.

Figure 8:
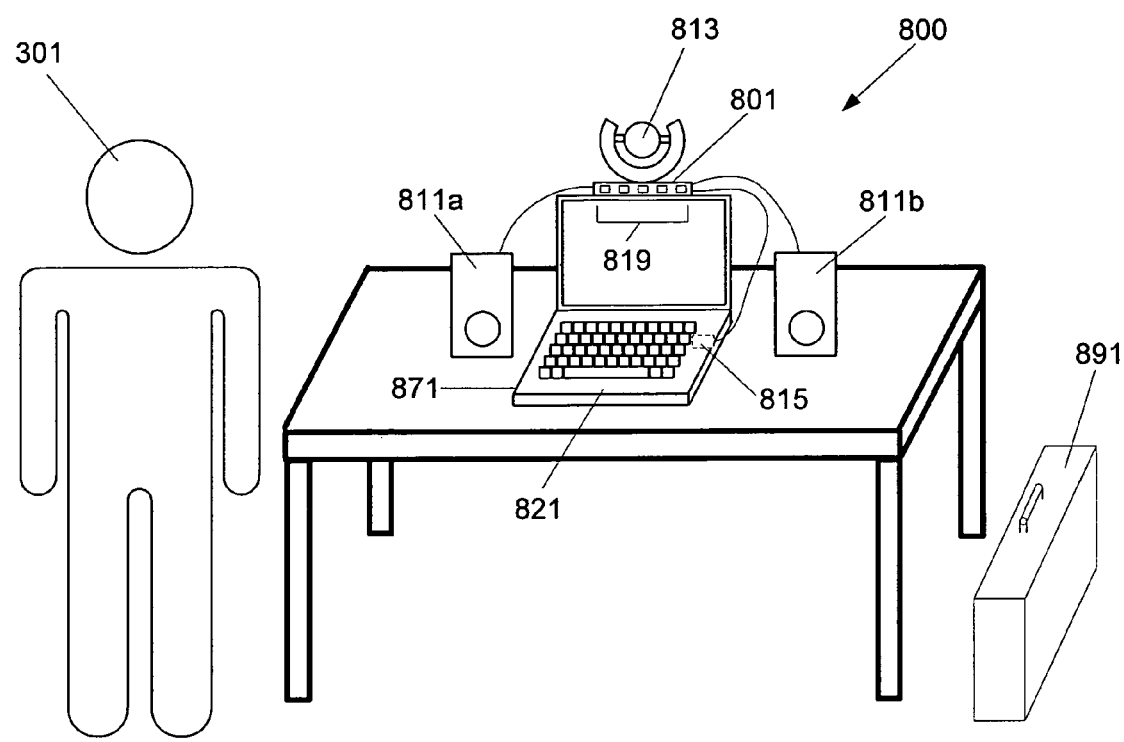
FIG. 8 illustrates the MCVCS for a laptop computer, according to an embodiment.

FIG. 8 illustrates an embodiment of the MCVCS 800 for a laptop computer 821. The MCVCS 800 may include a camera 813, microphones 819, and speakers 811 for use in a videoconference call with a laptop computer 821. The MCVCS components for use with a laptop 821 may be smaller than the components used with other computer systems. The camera base 801 and/or laptop components (e.g., processing card 815) may perform the various functions needed for the videoconference (e.g., compression and decompression of the video signals, audio processing, etc.). The processing card 815 may be a Personal Computer Memory Card International Association (PCMCIA) card. Other processing cards are also contemplated. Part or all of the processing functions may be performed by circuitry (e.g., Field Programmable Gate Arrays (FPGAs)) in the camera base 801. Part or all of the processing functions may be performed on the processing card 815. The camera base 801 and the processing card 815 may divide the processing functions. The camera 813 may be supported/coupled on top of the laptop 821 or may be separate from the laptop 821. While an adjustable pan/tilt camera 813 is shown, it is to be understood other cameras (e.g., fixed cameras) may be used. The camera 813 may be supported near the laptop 821. The speakers 811 may be coupled to the sides of the laptop 821 or may be placed on the side of laptop 811. In some embodiments, laptop components may be used in addition to or in place of videoconferencing components such as the microphones 819 and speakers 811. The laptop 811 and/or MCVCS 800 may be coupled to an external network through IP link 871. The components of the MCVCS 800 may be carried in a portable container (e.g., briefcase 893). The components may also be carried in the same case as the laptop. Similar portable containers may be used for MCVCS components that are used with a set-top box or separate codec.

In some embodiments, the codec may be installed into a projector. A user's laptop or PC may interface with the projector. The codec may also be installed in a flatscreen coupled to a user's laptop or PC. In some embodiments, a camera may be placed behind and in the center of a screen. The screen may be transparent at the location of the camera to allow the camera to capture video of the local participants. The location of the camera may allow for better eye contact. In some embodiments, the camera view may be manipulated to make the user appear further from the screen which may be more comfortable for the remote user.

Figure 9:
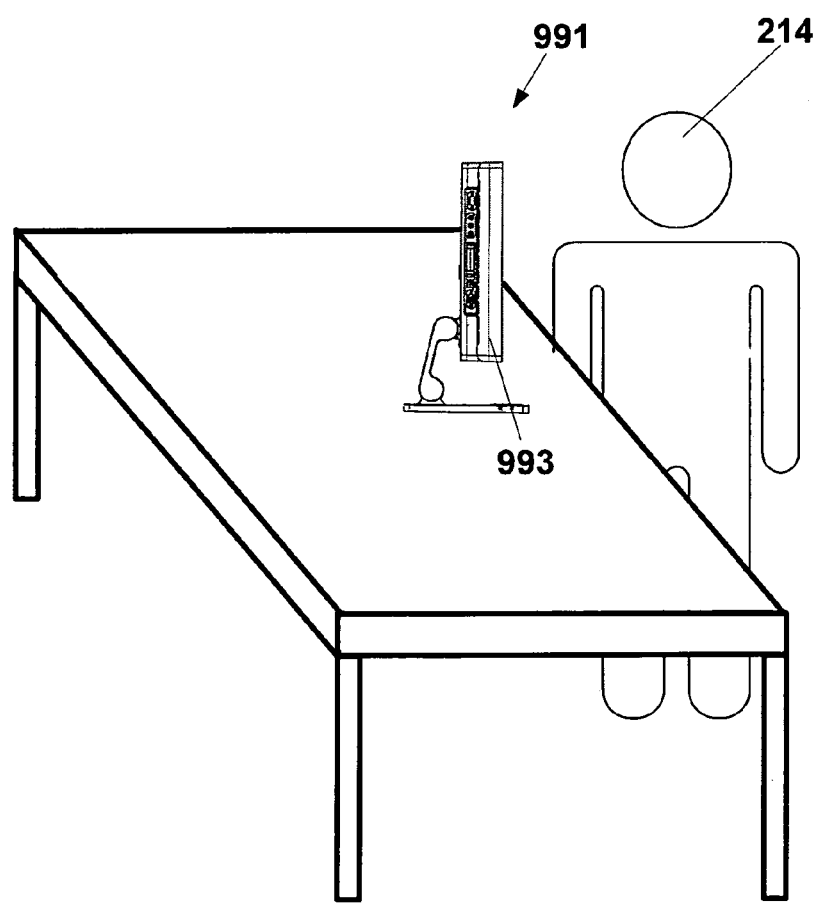
FIG. 9 illustrates a participant location with an integrated videoconferencing system, according to an embodiment.

FIG. 9 illustrates an embodiment of a participant location with an integrated videoconferencing system/MCVCS 991. In some embodiments, the components of the MCVCS 991 may be incorporated into a unitary housing 993. For example, the integrated videoconferencing system 991 may include microphones 1009 (e.g., see FIG. 10) to capture participant audio and a camera 1003 to capture participant video (along with corresponding audio processing capabilities). The integrated videoconferencing system 991 may also include speakers (e.g., ported speakers 1011) to produce audio from conference participants and a display (e.g., an HD display 1005) to provide video of conference participants. The integrated videoconferencing system 991 may include a codec for encoding and/or decoding). The integrated videoconferencing system 991 may also fold into a compact form for portability.

Figure 10:
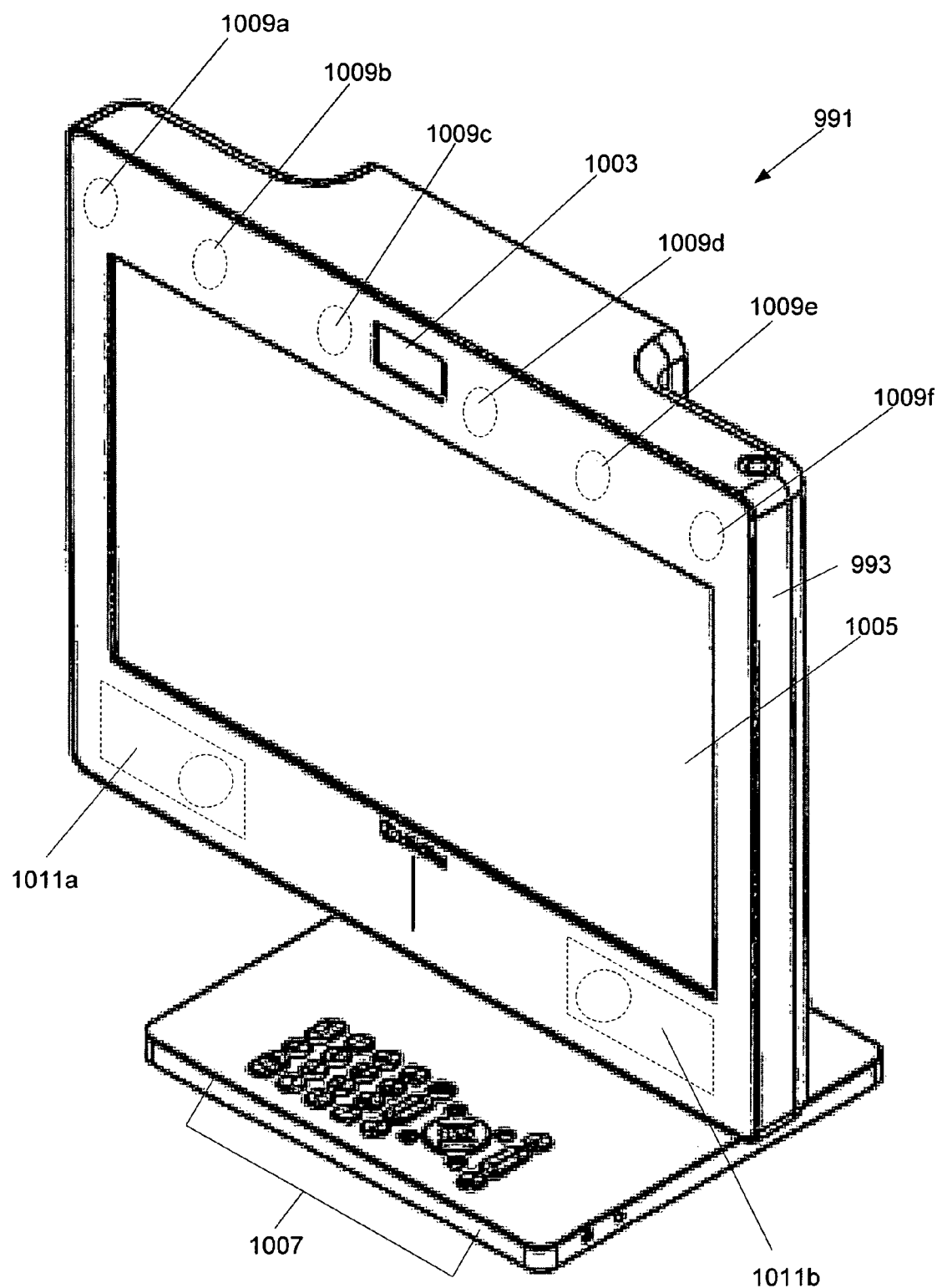
FIG. 10 illustrates an isometric view of the integrated videoconferencing system, according to an embodiment.

FIG. 10 illustrates an isometric view of an embodiment of the integrated videoconferencing system 991. The integrated videoconferencing system 991 may include one or more microphones 1009. For example, an array of six microphones 1009*a-f* in the top of the display in a broadside configuration may be used. Additional microphones may also be used (e.g., one additional microphone behind (or in front of) one or more of the six microphones) to form one or more endfire microphone arrays (e.g., see microphones 1009*g-h* in FIG. 12). Additional microphones may be used for longer endfire arrays. The broadside and/or endfire arrays may be used to determine a speaking participant's location and/or direction relative to the integrated videoconferencing system 991. The location and/or direction information may be sent with the audio signal to a remote conferencing system for placement of the audio at the remote site relative to the location and/or direction information. The integrated videoconferencing system 991 may support super wide band audio (e.g., 22 kHz responses). Other audio responses/frequencies are also contemplated (e.g., in excess of 22 kHz). In some embodiments, the integrated videoconferencing system may receive user inputs through a keypad 1007 on base 1091. For example, the user may enter a phone number, change the volume up/down, scroll through on-screen options, or press a hot key tied to a videoconference functionality. Other uses of the keypad are also contemplated.

Figure 11:
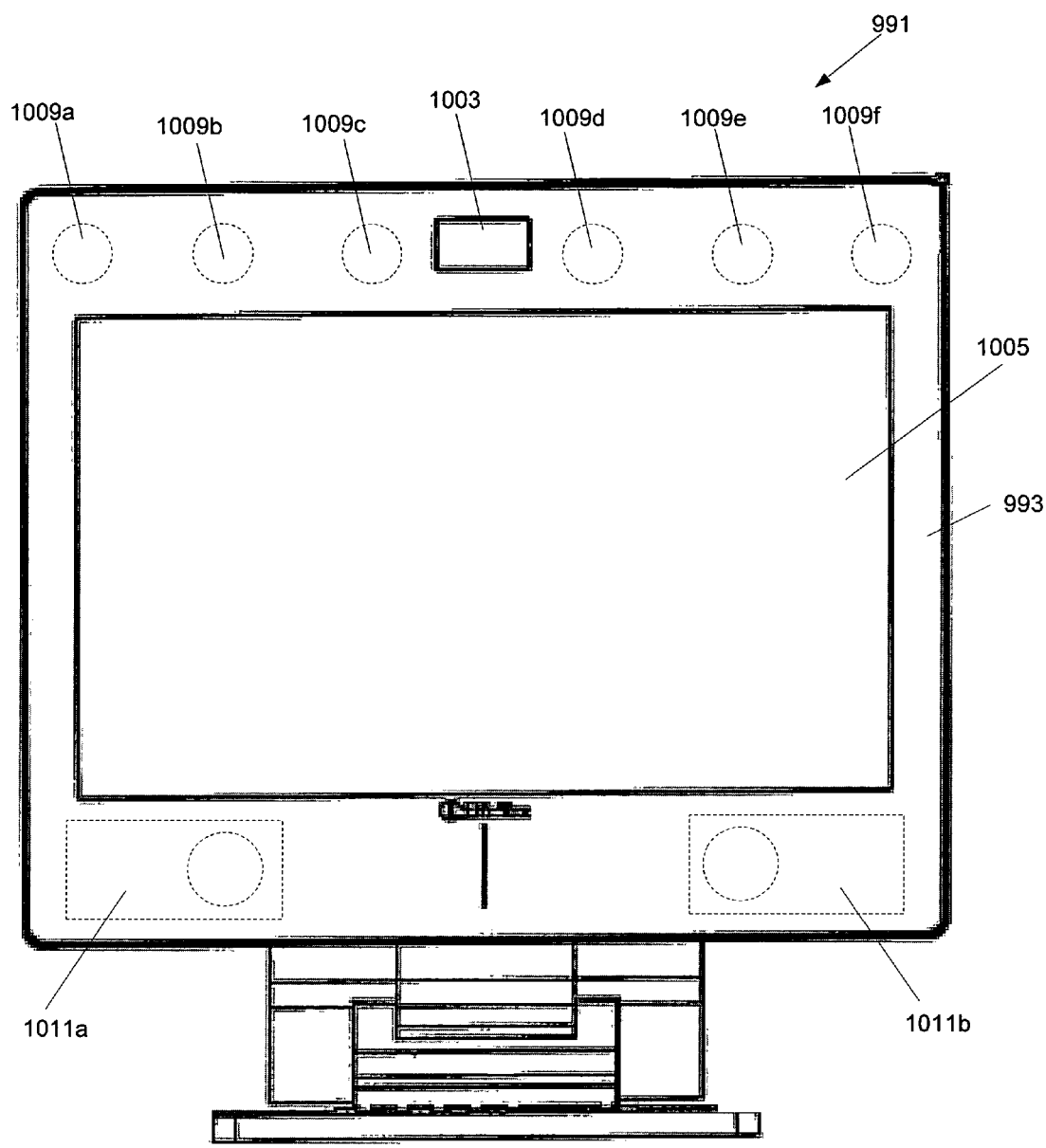
FIG. 11 illustrates a front view of the integrated videoconferencing system, according to an embodiment.
Figure 12:
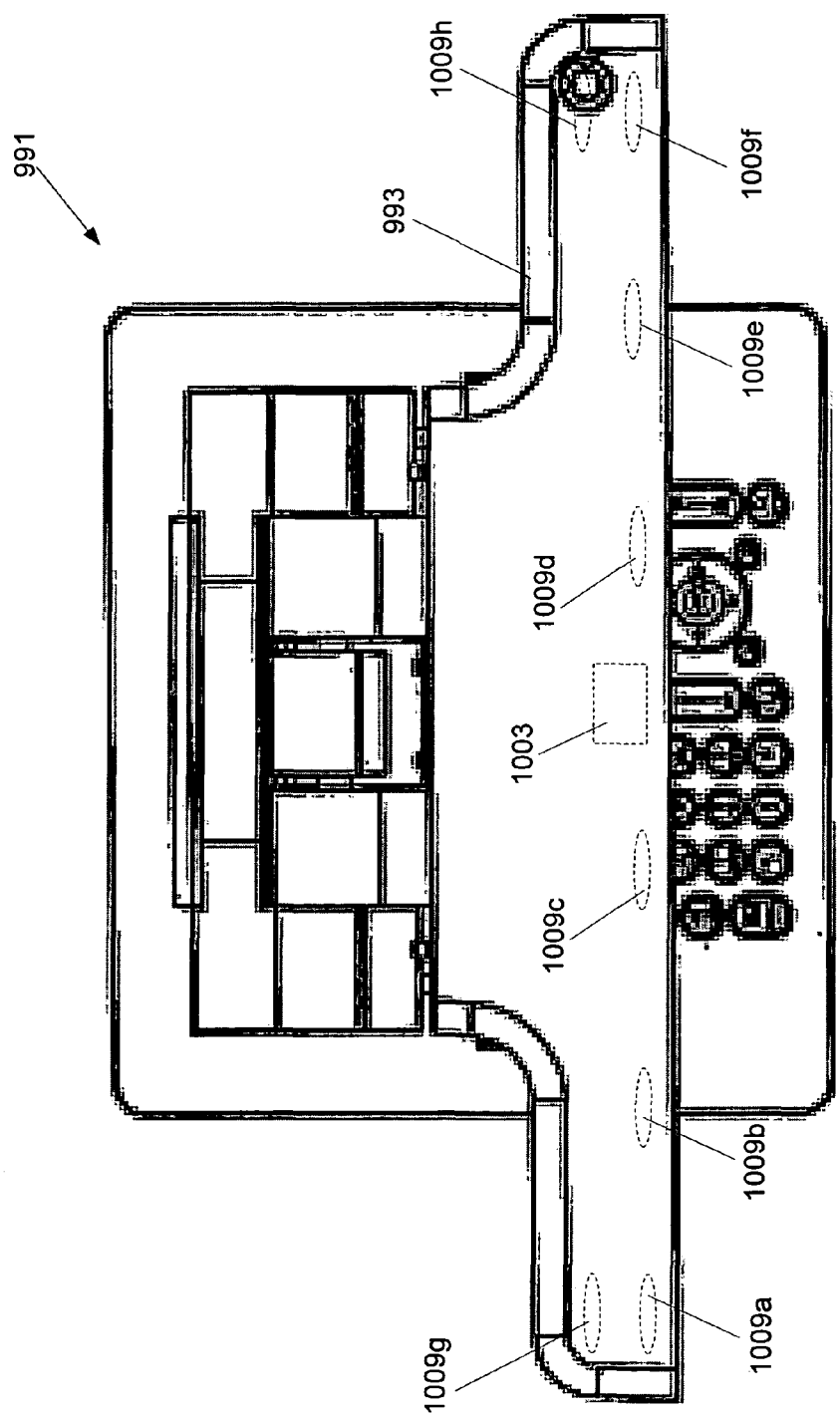
FIG. 12 illustrates a top view of the integrated videoconferencing system, according to an embodiment.

FIG. 11 illustrates a front view of an embodiment of the integrated videoconferencing system 991. FIG. 12 illustrates a top view of an embodiment of the integrated videoconferencing system 991. As seen in at least FIGS. 10-11, a unitary housing 893 of the integrated videoconferencing system 991 may house at least a display 1005, microphone 1009, speaker 1011, and camera 1003. The integrated videoconferencing system 991 may work as a stand-alone videoconferencing system or, the integrated videoconferencing system 991 may be coupled to a display, external speakers (e.g., through an external speakerphone), etc. to support a room environment. For example, the received video signal on the integrated videoconferencing system may be provided to an external display and the audio to external speakers. A codec embedded in the integrated videoconferencing system may provide the encoding/decoding functionality for the received/sent signals.

Figure 13:
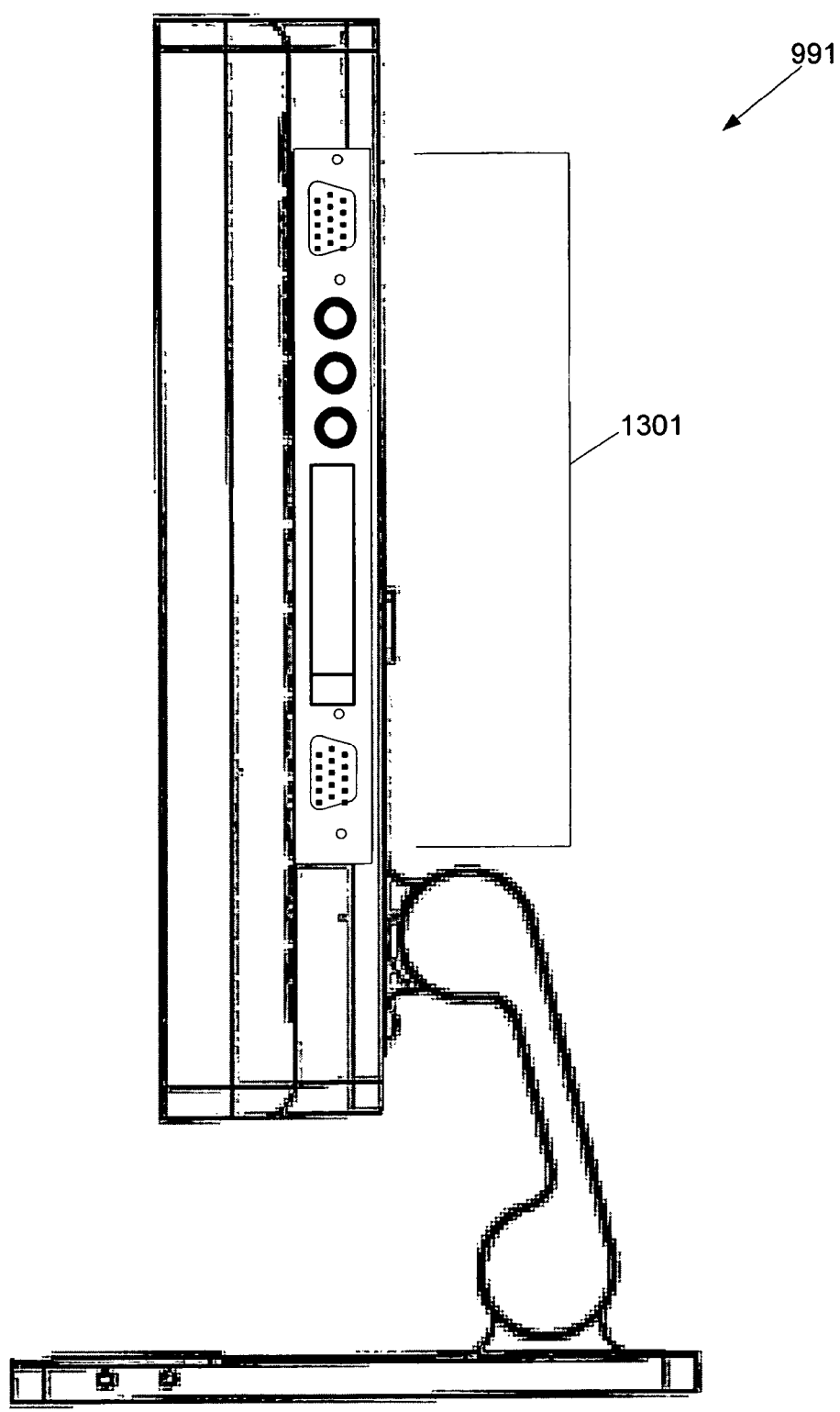
FIG. 13 illustrates a right side view of the integrated videoconferencing system, according to an embodiment.

FIG. 13 illustrates a right side view of an embodiment of the integrated videoconferencing system 991. The integrated videoconferencing system 991 may include multiple ports 1301 (ports may also be included on the opposite side of the integrated videoconferencing system 991). For example, the ports 1301 may include a port for a video input to plug in a personal computer (PC) (e.g., a video graphics array (VGA) input)). With the video input, the display 1005 of the integrated videoconferencing system 991 may be used as the display for the PC (in addition to being the display for a videoconference). The display may be connected to a PC through a direct cable connection. Other ports such as a power supply port, RS-232 control port, and a headset jack port may also be used. The integrated videoconferencing system 991 may support plug and play devices. The integrated videoconferencing system 991 may also support RJ-45 Network Local Area Network (LAN) connections, RJ-11 connections, and RJ-1 connections. In some embodiments, inputs including High Definition Camera input, S-Video input, Radio Corporation of America (RCA) (L+C+R analog) input, VGA input, a composite input, and stereo mini-jack input may also be supported. These and other inputs/outputs (e.g., an external mic jack input) may be provided on the base. The integrated videoconferencing system 991 may support VGA output, RCA output, and headphone output (e.g., 3.5 mm headphones).

In some embodiments, the integrated videoconferencing system 991 may also support dual streams for sharing PC content during a videoconference (e.g., standards based (H.239) dual streaming for real-time collaboration in high definition). Media shared through the integrated videoconferencing system 991 may include documents, presentations, and PC screens. Other media may also be shared. The integrated videoconferencing system 991 may support Internet Protocol (IP) to integrated services digital network (ISDN) connectivity.

Figure 14:
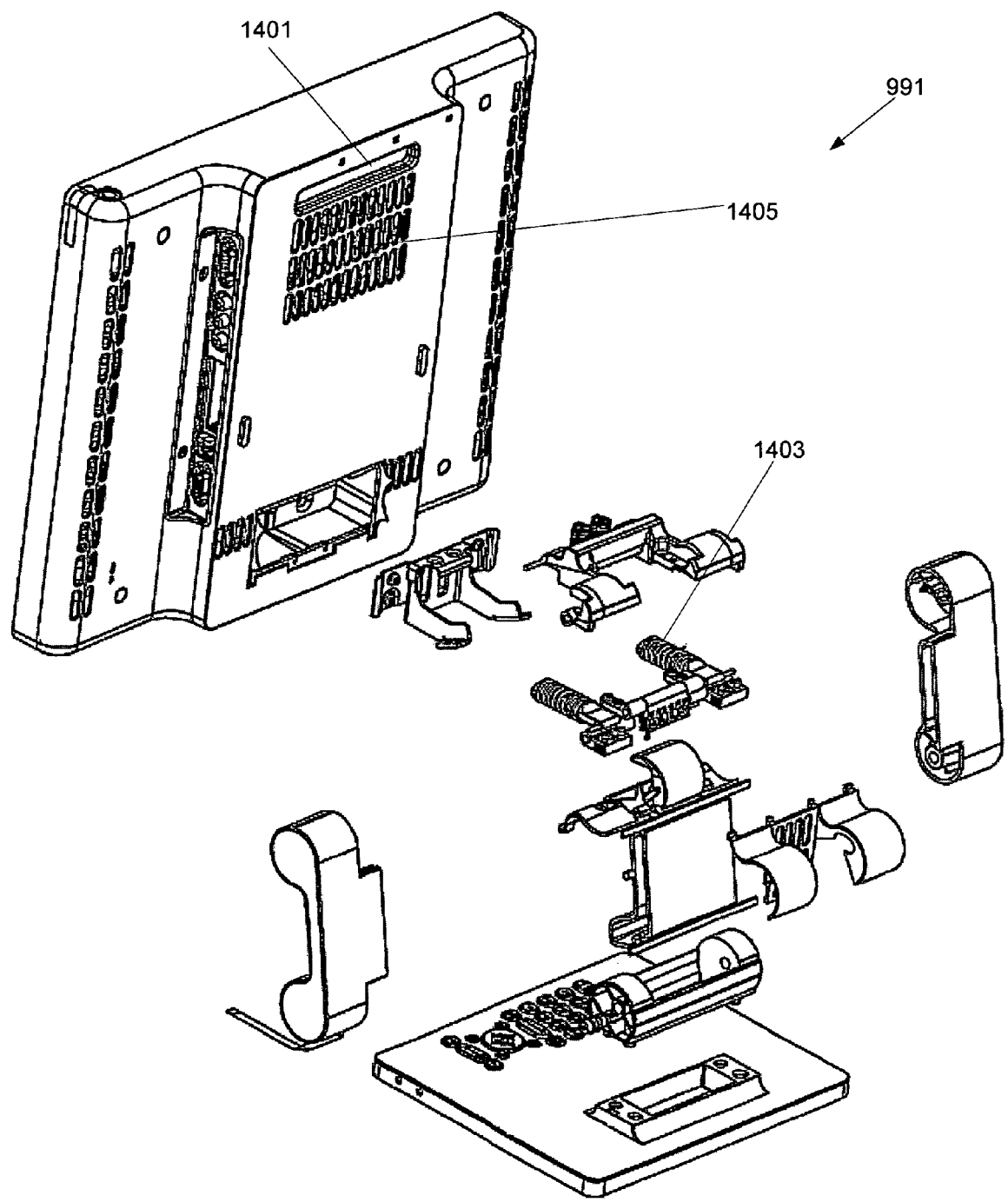
FIG. 14 illustrates an exploded view of the folding mechanism of the integrated videoconferencing system, according to an embodiment.

FIG. 14 illustrates an exploded view of an embodiment of the folding mechanism of the integrated videoconferencing system 991. The integrated videoconferencing system 991 may include a folding mechanism coupling the display 1005 to the base 1091. The folding mechanism may allow for convenient folding of the display 1005 onto the base 1091. The folding mechanism may include dual hinges biased by one or more springs 1403. Other hinge configurations (including other biasing mediums are also contemplated). In some embodiments, the hinge may not be biased. The integrated videoconferencing system 991 may include one or more fans 1405 vented to the exterior of the integrated videoconferencing system 991 for cooling the components of the integrated videoconferencing system 991. The integrated videoconferencing system 991 may include a handle 1401 (e.g., embedded into the housing of the integrated videoconferencing system 991) for carrying the integrated videoconferencing system 991. The handle 1401 may be accessible when the integrated videoconferencing system 991 is in an open or folded configuration. The keypad 1007 may be visible when the integrated videoconferencing system 991 is unfolded.

Figure 15B:
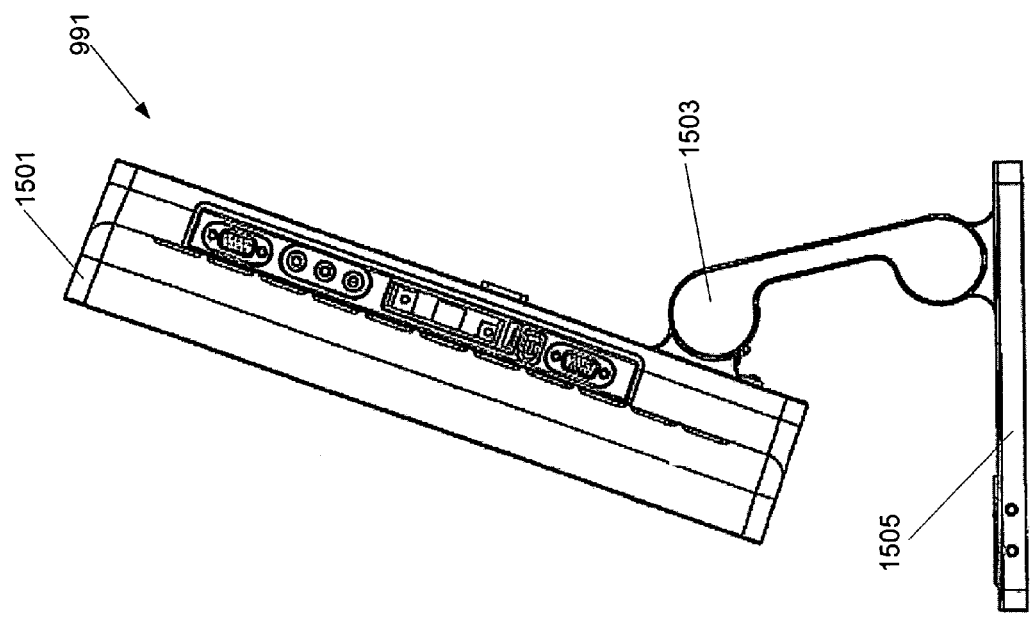
FIGS. 15a-c illustrates a folding sequence of the integrated videoconferencing system, according to an embodiment.
Figure 15A:
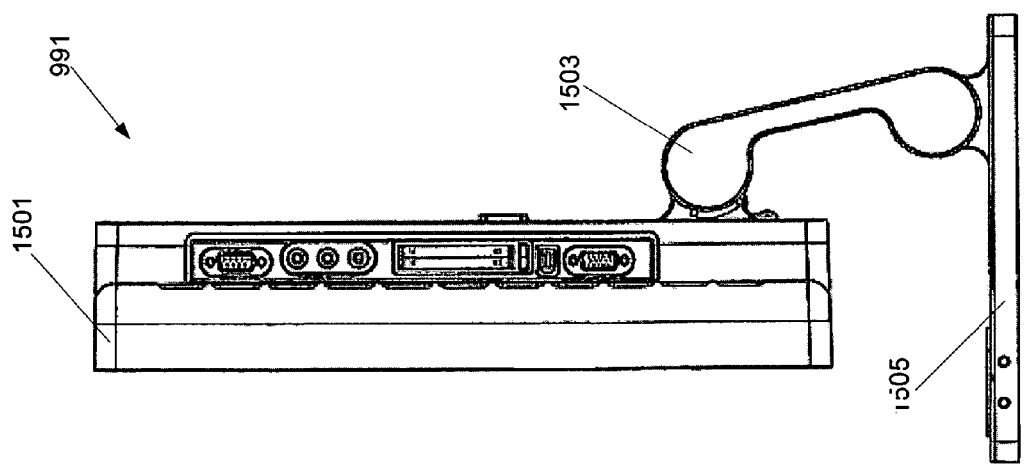
Figure 15C:
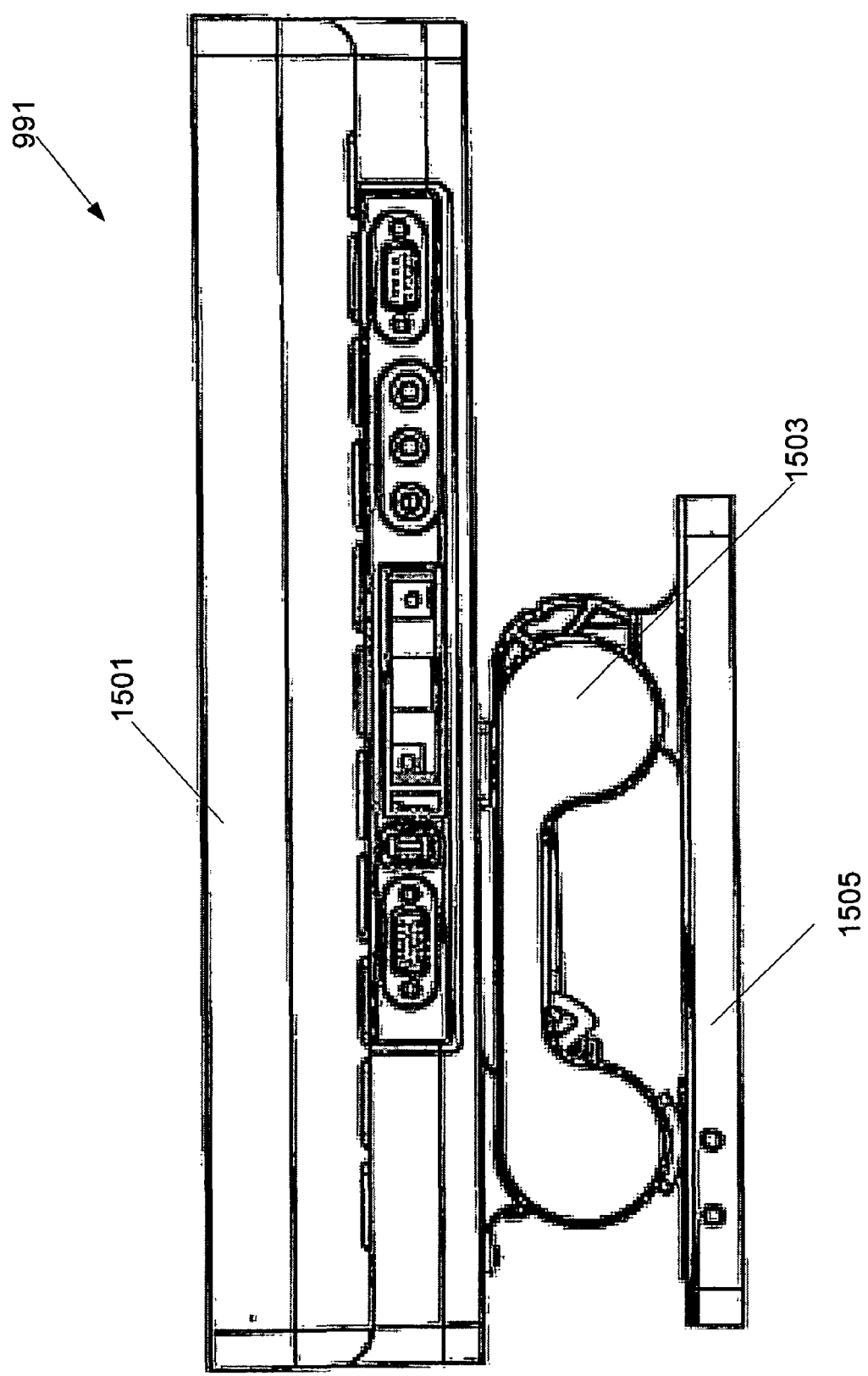

FIGS. 15*a*-*c* illustrate the folding sequence of an embodiment of the integrated videoconferencing system 991. In some embodiments, a display portion 1501 may be tilted relative to a dual hinge portion 1503. The base portion 1091 may be tilted relative to the dual hinge portion 1503. Both hinges of the dual hinge portion 1503 may be folded to close proximity to the base 1091 and display portion 1501.

Figure 16:
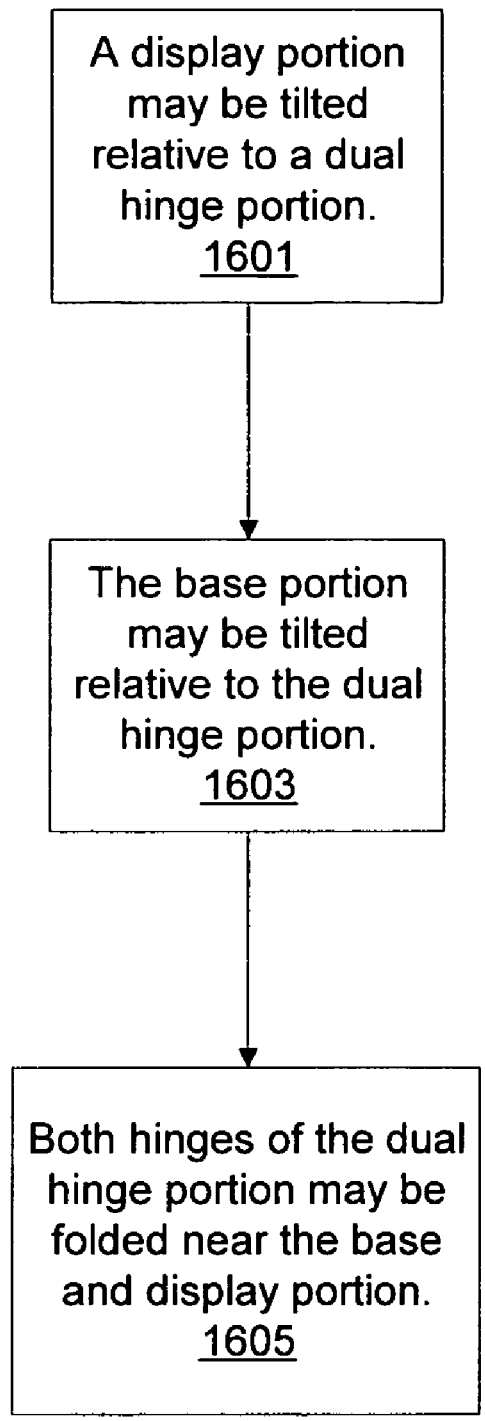
FIG. 16 illustrates a method for folding the integrated videoconferencing system, according to an embodiment.
Figure 17A:
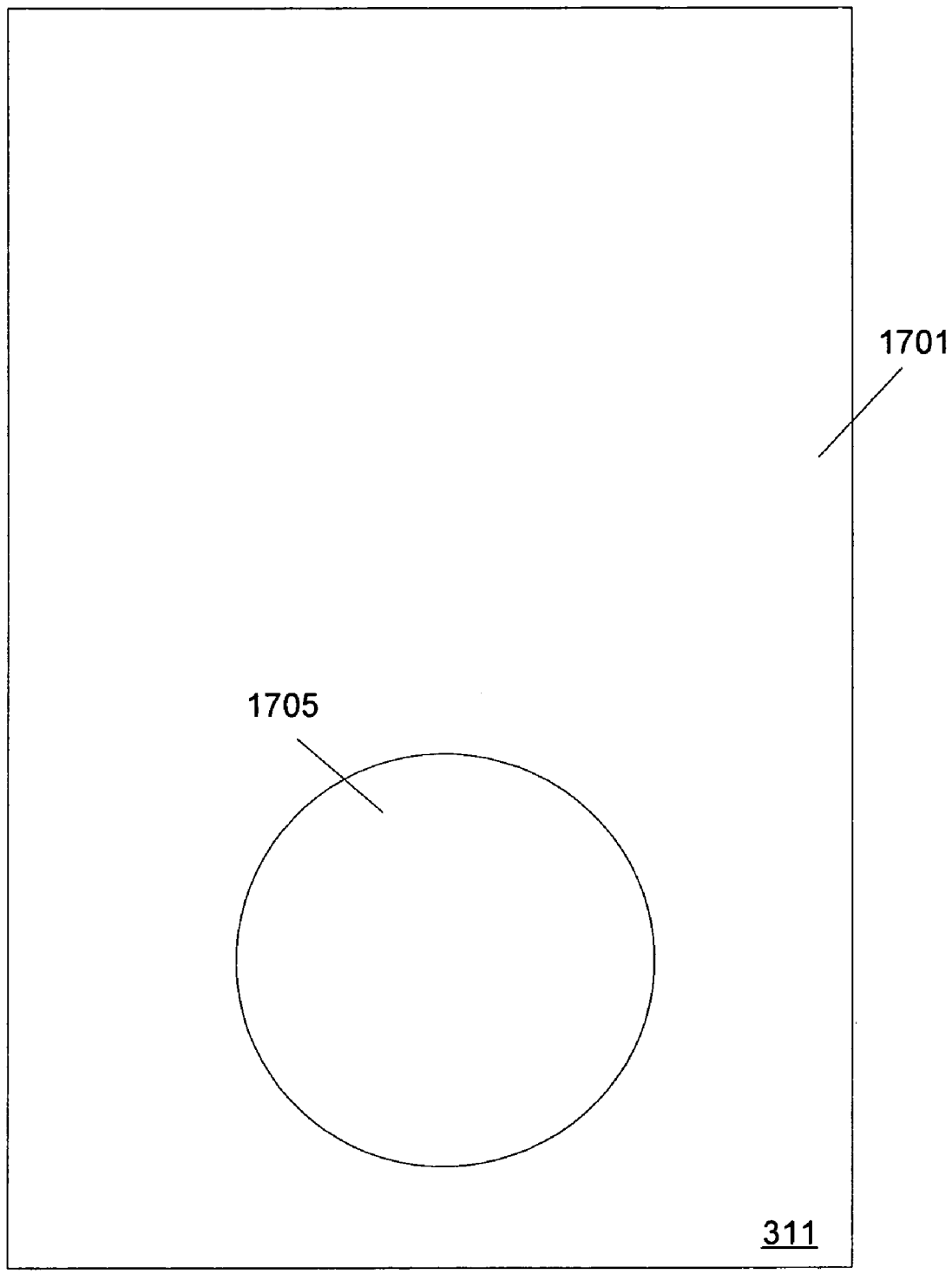
FIGS. 17a-d illustrate the speaker casing and diaphragm, according to embodiments.
Figure 17B:
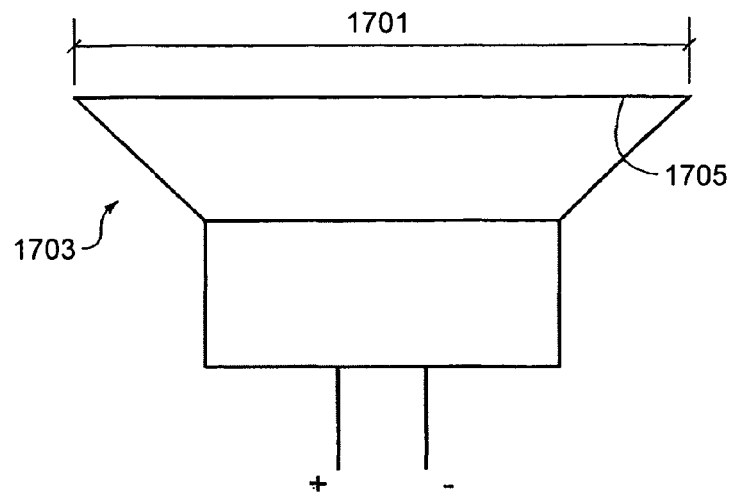
Figure 17C:
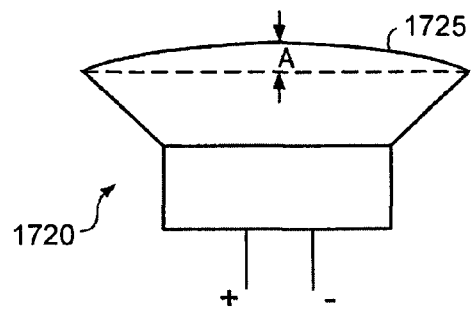
Figure 17D:
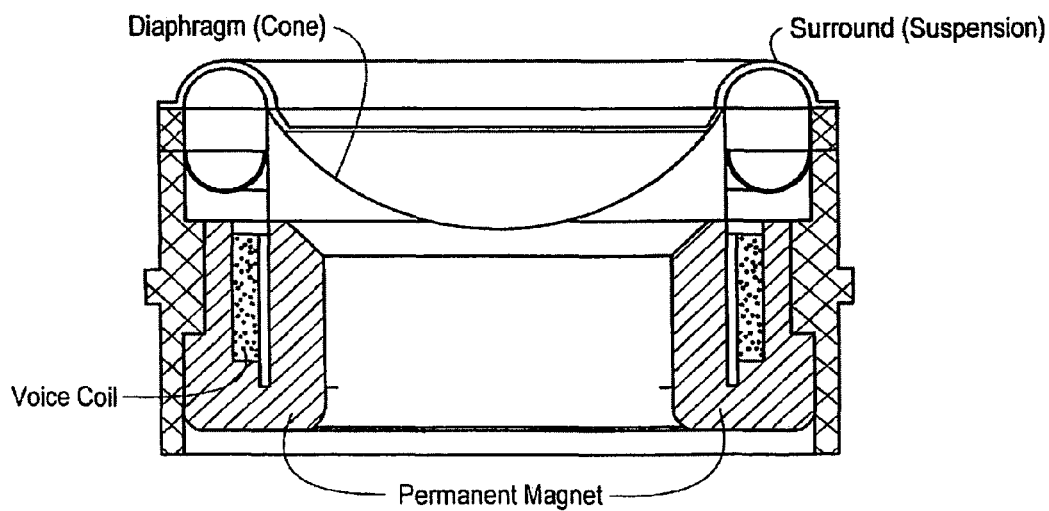

FIG. 16 illustrates an embodiment of a method for integrated videoconferencing. It should be noted that in various embodiments of the methods described below, one or more of the elements described may be performed concurrently, in a different order than shown, or may be omitted entirely. Other additional elements may also be performed as desired.

At 1601, a display portion may be tilted relative to a dual hinge portion.

At 1603, the base portion may be tilted relative to the dual hinge portion.

At 1605, both hinges of the dual hinge portion may be folded near the base and display portion. The base and display portions may fold into a compact form with the base and display portions approximately parallel in close proximity to each other.

FIGS. 17*a*-*d* illustrate embodiments of the speaker casing 1701 and diaphragm 1705. The speaker may use a long-throw transducer 1725 to achieve a large excursion. The speaker diaphragm may be a curved surface (such as a portion of a paraboloid, or, a portion of a sphere or oblate sphere, a truncated cone, etc.). The speaker 311 may be driven from its perimeter instead of from its base. The speaker 311 may be a 2" diameter speaker (other speaker sizes are also contemplated). Because of the larger excursion, the speaker 311 may achieve air displacement equivalent to much larger diameter speakers (such as speakers with diameters in the range of 3" to 3.5"). Furthermore, because the speaker has a smaller diameter, the radiation pattern of the speaker may be broader than the larger diameter speakers. This broader radiation pattern may be due to the smaller speaker aperture and/or the "stiffer" diaphragm being less likely to "break up" (i.e., move in higher-order vibrational modes). These higher-order vibrational modes may create standing waves along the surface of the diaphragm, which can act to increase distortion and also to increase the directionality (i.e., to make it more directional), because of the frequency-dependent nulls in the radiation pattern that are created as one part of the diaphragm vibrates in a different manner than other parts of the same diaphragm.

Figure 18A:
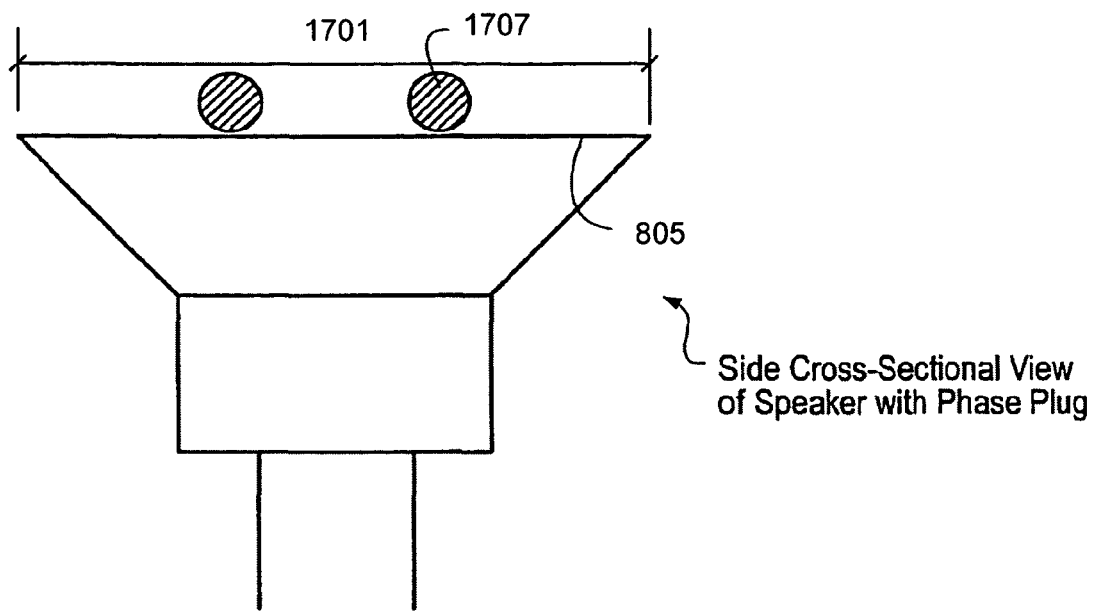
FIGS. 18a-b illustrates a phase plug for the speaker, according to an embodiment.
Figure 18B:
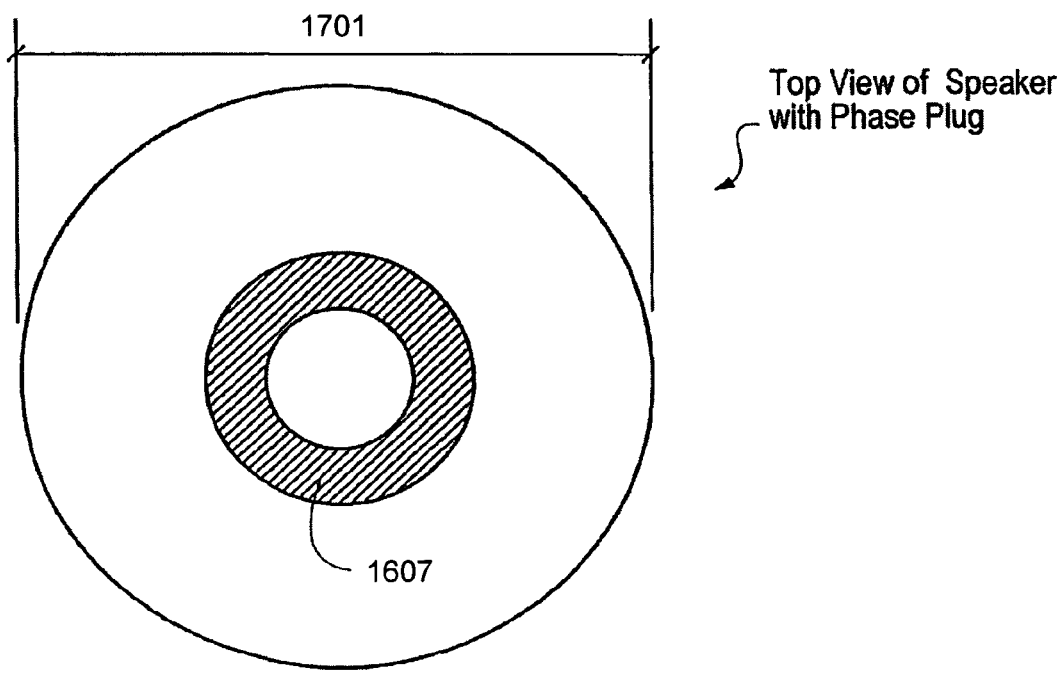

FIGS. 18*a*-*b* illustrate an embodiment of a phase plug 1707 for the speaker 311. In some embodiments, a speaker 311 may be configured with a phase plug 1707. The phase plug 1707 may be shaped like a circular ring. The phase plug 1707 may be suspended above the diaphragm of the speaker 311 at a distance sufficient to ensure that the diaphragm does not contact the phase plug even at maximum excursion. The phase plug 1707 serves to diffract sound coming out of the speaker 311. For example, the phase plug 1707 may diffract high frequencies at acute angles (i.e., at angles less than 90 degrees) relative to the central axis of the speaker 311.

In various embodiments, the diffraction of the high frequencies induced by the phase plug 1707 may make the speaker's transmission pattern less narrowly focused at high frequencies. The phase plug 1707 may be circular in the side cross-section of FIG. 18*b*. However, the phase plug 1707 may have other non-circular cross-sections. For example, The phase plug 1707 may have a rectangular cross-section. The speaker may be configured with a smaller diameter, a larger excursion, and a phase plug 1707 by combining the teachings of the above described embodiments.

Figure 19A:
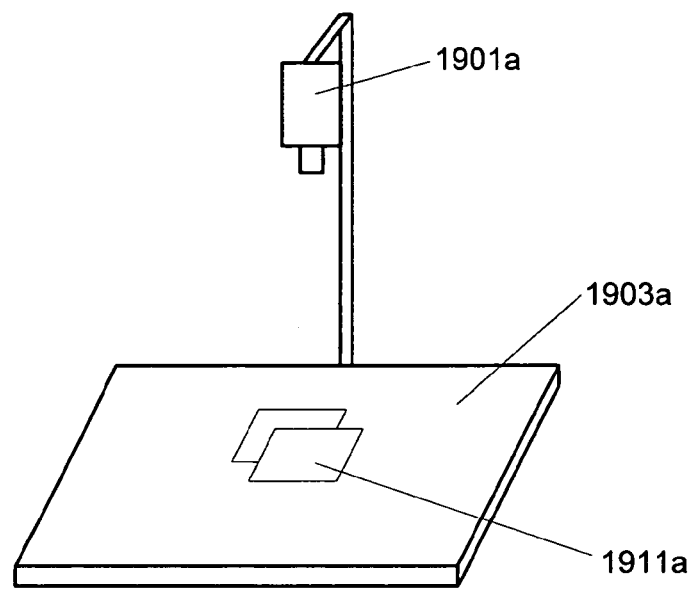
FIGS. 19a-b illustrate a document camera and display screen, according to an embodiment.
Figure 19B:
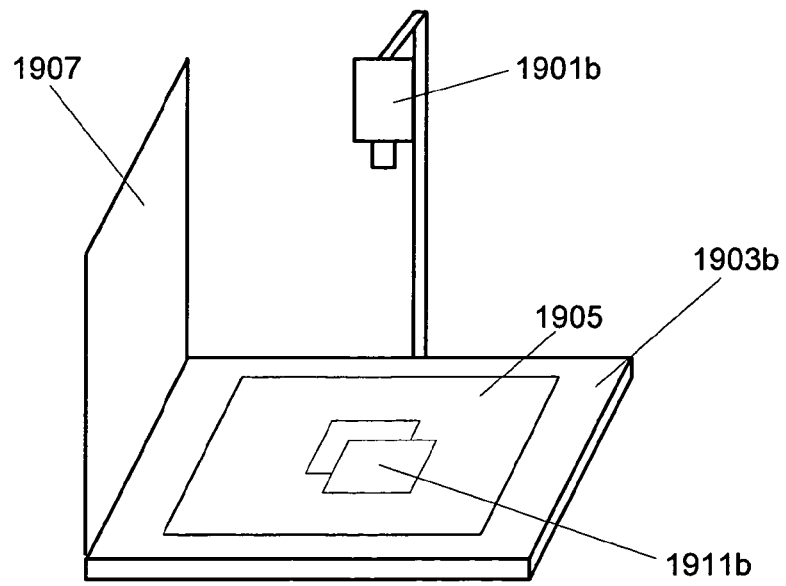

FIGS. 19*a*-*b* illustrate an embodiment of an overhead camera 1901 (e.g., an HD camera) that may be used to share documents on a tabletop 1903. The overhead camera 1901 may be used with the MCVCS 300, 700, 800, and/or 991. The overhead camera 1901 may also be used as stand-alone equipment. The camera 1901*a* may capture documents 1911*a* placed on the tabletop 1903*a* at a local conference site and send the corresponding images to a remote conference site for display. Tabletop 1903*b* may include a display 1905 for displaying the documents 1911*b* captured at the local site. The camera 1901 and/or display 1905 may be coupled to a videoconferencing system to be used during a videoconference.

Figure 20A:
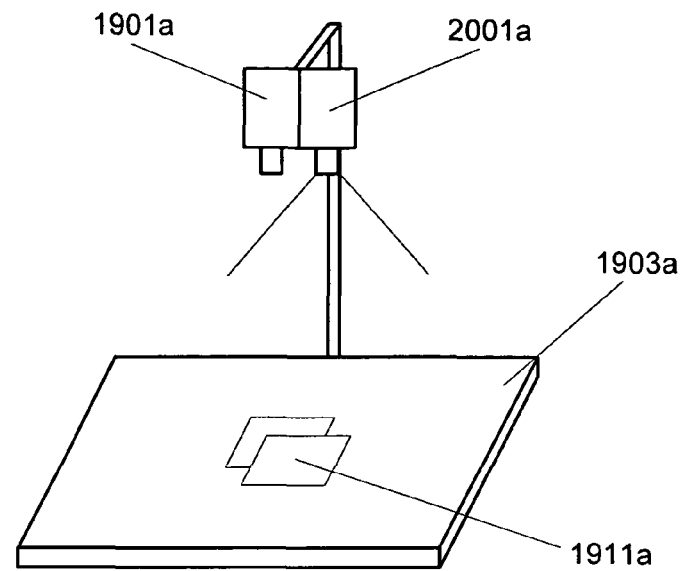
FIGS. 20a-b illustrate a document camera and projector, according to an embodiment.
Figure 20B:
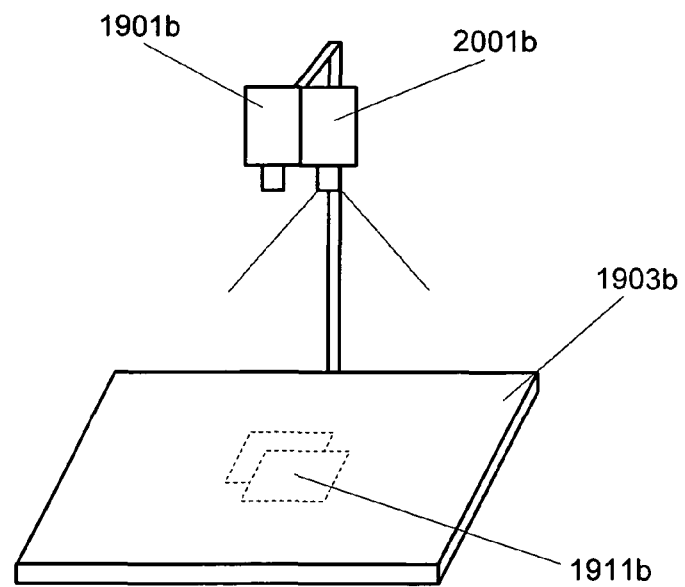

FIGS. 20*a*-*b* illustrate an embodiment of an overhead camera 1901 and projector 2001. The camera 1901*a* may capture the image of documents 1911*a* placed on tabletop 1903*a*. A projector 2001*b* may project images of the documents onto tabletop 1903*b*. The tabletop 1903 may include a surface that can be erasably marked by the remote participants. For example, the remote participants may mark on the images of the documents projected onto the tabletop 1903*b*. The markings may be captured by camera 1901*b* and sent back to the local site where the markings may be projected onto the documents 1911 by the projector 2001*a*.

Figure 21A:
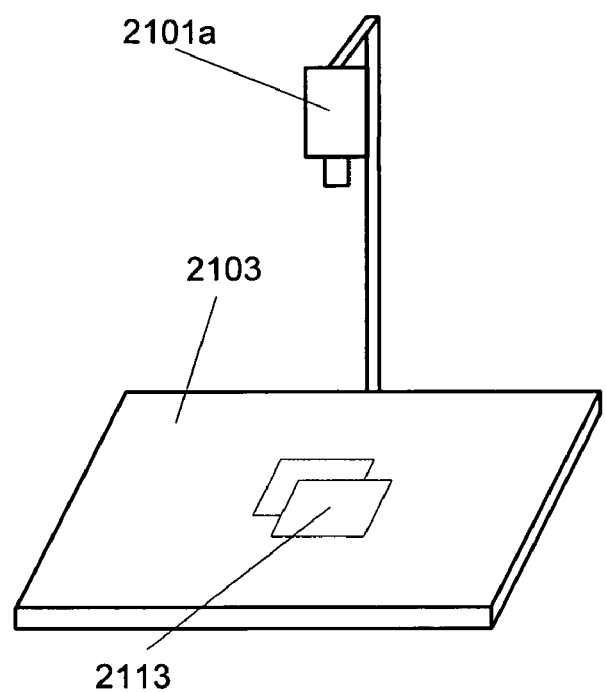
FIGS. 21a-b illustrate a document camera with a touch-screen display, according to an embodiment.
Figure 21B:
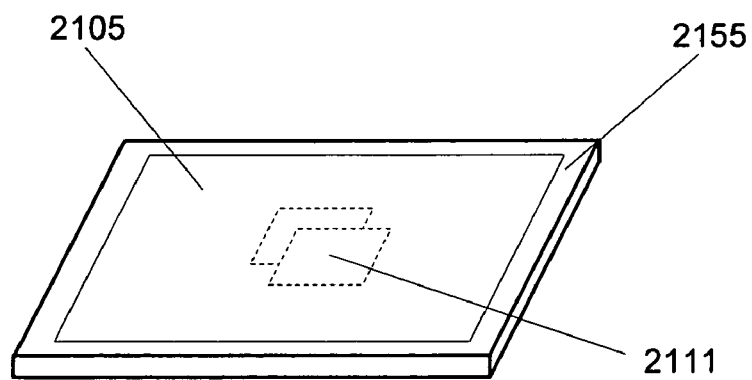

FIGS. 21*a*-*b* illustrate another embodiment of the overhead camera/projector system. In some embodiments, the documents 2113 may be placed on a separate table 2103 with a separate camera 2101*a*. An image 2111*a* may be displayed on screen 2105 at the local and remote sites. Markings made on the displays at each site may be displayed for both sites (e.g., in a different color). Instead of a display, the images may be projected by a projector. The images may be projected onto a surface and markings put on the images at each site may be transmitted to the other site for display. The markings may be detected by a touchscreen or by a camera.

Figure 22:
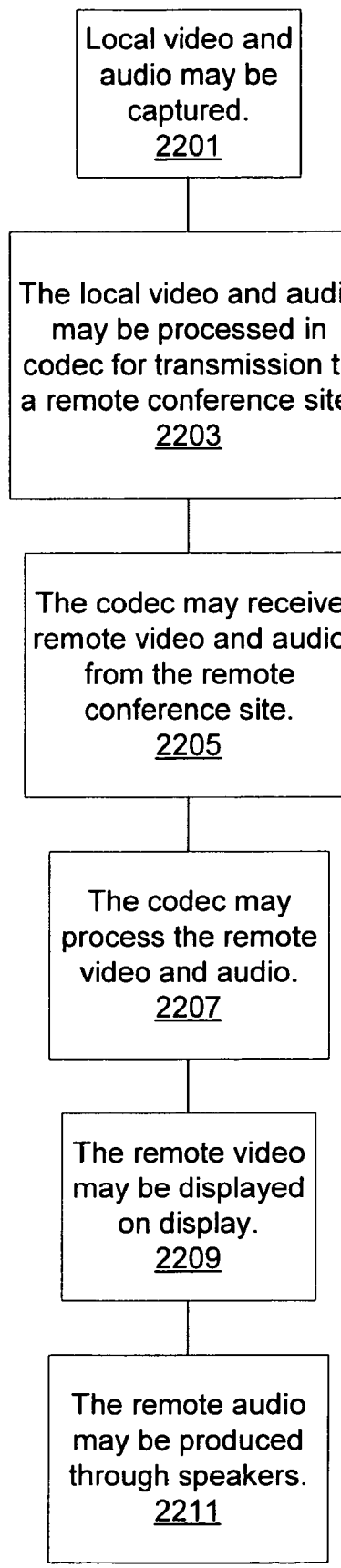
FIG. 22 illustrates a method of videoconferencing through the MCVCS, according to an embodiment.

FIG. 22 illustrates a method of videoconferencing through the MCVCS 300, according to an embodiment. It should be noted that in various embodiments of the methods described below, one or more of the elements described may be performed concurrently, in a different order than shown, or may be omitted entirely. Other additional elements may also be performed as desired.

At 2201, local video and audio may be captured. For example, camera 303 may capture video of local participants and microphones 319 may capture audio of local participants.

At 2203, the local video and audio may be processed in codec 309 for transmission to a remote conference site.

At 2205, the codec 309 may receive remote video and audio from the remote conference site.

At 2207, the codec 309 may process the remote video and audio.

At 2209, the remote video may be displayed on display 305.

At 2211, the remote audio may be produced through speakers 311.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An integrated videoconferencing system, comprising:
a display;
a microphone;
a speaker;
a high definition (HD) camera;
a hinge; and
a base;
wherein the display, microphone, speaker, and HD camera are comprised in a unitary housing; and
wherein the hinge couples the base to the unitary housing and wherein the hinge is configured to fold the base into closer proximity to the unitary housing when in a folded position.

2. The integrated videoconferencing system of claim 1, wherein the base comprises a keypad.

3. The integrated videoconferencing system of claim 1, further comprising a microphone array that includes the microphone.

4. The integrated videoconferencing system of claim 3, wherein the microphone array is a horizontal microphone array.

5. The integrated videoconferencing system of claim 4, further comprising at least one microphone placed behind the horizontal microphone array to form an endfire array with at least one microphone of the horizontal microphone array.

6. The integrated videoconferencing system of claim 1, wherein the display is an HD display.

7. The integrated videoconferencing system of claim 1, comprising at least two speakers that include the speaker, wherein the system is configured to position audio from a remote videoconference site through the at least two speakers.

8. The integrated videoconferencing system of claim 1, wherein the speaker is a ported speaker.

9. An integrated videoconferencing system, comprising:
a high definition (HD) display;
an array of microphones;
at least two speakers;
an HD camera;
a hinge; and
a base;
wherein the HD display, array of microphones, at least two speakers, and HD camera are comprised in a unitary housing; and
wherein the hinge couples the base to the unitary housing and wherein the hinge is configured to fold the base into closer proximity to the unitary housing when in a folded position.

10. The integrated videoconferencing system of claim 9, wherein the system is configured to position audio from a remote videoconference site through the at least two speakers.

11. The integrated videoconferencing system of claim 9, wherein the array of microphones is a horizontal microphone array.

12. The integrated videoconferencing system of claim 9, further comprising at least one microphone placed behind the horizontal microphone array to form an endure array with at least one microphone of the horizontal microphone array.

13. The integrated videoconferencing system of claim 9, wherein the at least two speakers are ported speakers.

14. An integrated videoconferencing system, comprising:
a high definition (HD) display;
a horizontal array of microphones;

at least one microphone positioned behind the horizontal array of microphones to form an endfire array with at least one of the microphones in the horizontal array;
at least two speakers;
an HD camera;
a hinge; and
a base; wherein the hinge couples the base to the unitary housing and wherein the hinge is configured to fold the base into closer proximity to the unitary housing when in a folded position;
wherein the HD display, array of microphones, at least two speakers, and HD camera are comprised in a unitary housing.

15. The integrated videoconferencing system of claim 14, further comprising a keypad comprised on the base.

16. The integrated videoconferencing system of claim 14, wherein the at least two speakers are ported speakers.

17. The integrated videoconferencing system of claim 14, wherein the hinge is a double hinge and wherein the unitary housing and the base are operable to move relative to each other via the double hinge.

18. The integrated videoconferencing system of claim 14, wherein each of the at least two speakers contains at least one phase plug.

19. The integrated videoconferencing system of claim 14, further comprising a second camera configured to capture documents placed on a table and capture changes made to said documents by participants in a videoconference.

* * * * *

UNITED STATES PATENT AND TRADEMARK OFFICE
CERTIFICATE OF CORRECTION

| | | |
|---|---|---|
| PATENT NO. | : 7,907,164 B2 | Page 1 of 1 |
| APPLICATION NO. | : 11/405686 | |
| DATED | : March 15, 2011 | |
| INVENTOR(S) | : Kenoyer et al. | |

It is certified that error appears in the above-identified patent and that said Letters Patent is hereby corrected as shown below:

In the Claims:

Column 16, Claim 12,
Line 61, please delete "endure" and substitute -- endfire --.

Signed and Sealed this
Thirty-first Day of May, 2011

David J. Kappos
*Director of the United States Patent and Trademark Office*